US011009580B2

(12) United States Patent
Marshall et al.

(10) Patent No.: US 11,009,580 B2
(45) Date of Patent: May 18, 2021

(54) INTERCEPTING AN UPLINK SIGNAL TO ASSIST IN TIMING OR POSITIONING CALCULATIONS

(71) Applicant: u-blox AG, Thalwil (CH)

(72) Inventors: Christopher Marshall, Haywards Heath (GB); Pascal Herczog, Cambridge (GB); Dusko Vujadinovic, Cambridge (GB)

(73) Assignee: u-blox AG, Thalwil (CH)

(*) Notice: Subject to any disclaimer, the term of this patent is extended or adjusted under 35 U.S.C. 154(b) by 0 days.

(21) Appl. No.: 16/466,282

(22) PCT Filed: Dec. 1, 2017

(86) PCT No.: PCT/EP2017/081249
§ 371 (c)(1),
(2) Date: Jun. 3, 2019

(87) PCT Pub. No.: WO2018/100189
PCT Pub. Date: Jun. 7, 2018

(65) Prior Publication Data
US 2020/0081090 A1 Mar. 12, 2020

(30) Foreign Application Priority Data
Dec. 1, 2016 (WO) ............... PCT/EP2016/079507

(51) Int. Cl.
G01S 5/02 (2010.01)
G01S 5/00 (2006.01)
G01S 5/14 (2006.01)
H04W 64/00 (2009.01)

(52) U.S. Cl.
CPC .......... *G01S 5/0236* (2013.01); *G01S 5/0036* (2013.01); *G01S 5/145* (2013.01); *H04W 64/003* (2013.01)

(58) Field of Classification Search
CPC ...... G01S 5/0236; G01S 5/145; G01S 5/0036; G01S 5/0018; H04W 64/003; Y02D 70/10; Y02D 70/00; Y02D 70/21; Y02D 70/142; Y02D 70/164; Y02D 70/1262; Y02D 30/70
USPC ............................... 455/456.1–457
See application file for complete search history.

(56) References Cited

U.S. PATENT DOCUMENTS 8,886,113 B2   11/2014 Palanki et al.
2014/0120947 A1   5/2014 Siomina
2015/0011236 A1*  1/2015 Kazmi ............... G01S 5/0226
                                                    455/456.1

(Continued)

OTHER PUBLICATIONS

International Search Report and Written Opinion dated Feb. 12, 2018 in International Application No. PCT/EP2017/081249.

*Primary Examiner* — Michael Y Mapa
(74) *Attorney, Agent, or Firm* — Finnegan, Henderson, Farabow, Garrett & Dunner, LLP

(57) ABSTRACT

Methods and apparatus are disclosed for sharing, by a first User Equipment, interception-assistance information relating to an uplink signal transmitted by the first User Equipment. The interception-assistance information may be used to assist a second User Equipment to intercept the uplink signal and measure at least one characteristic of it. Calculation-assistance information may be used to assist in the calculation of a position or time, based on the measured characteristic.

20 Claims, 17 Drawing Sheets

(56) References Cited

U.S. PATENT DOCUMENTS

| | | | |
|---|---|---|---|
| 2015/0208262 A1* | 7/2015 | Siomina | H04W 24/10 |
| | | | 370/252 |
| 2015/0215793 A1 | 7/2015 | Siomina et al. | |
| 2015/0230055 A1* | 8/2015 | Smith | H04M 1/72572 |
| | | | 455/456.3 |
| 2016/0227373 A1* | 8/2016 | Tsai | G01S 5/0284 |
| 2016/0286353 A1* | 9/2016 | Barlev | H04W 4/029 |

* cited by examiner

INTERCEPTING AN UPLINK SIGNAL TO ASSIST IN TIMING OR POSITIONING CALCULATIONS

CLAIM FOR PRIORITY

This application is a U.S. national phase entry under 35 U.S.C. § 371 from PCT International Application No. PCT/EP2017/081249, filed Dec. 1, 2017, which claims priority from PCT International Application No. PCT/EP2016/079507, both of which this application claims priority and are incorporated herein by reference.

FIELD OF THE INVENTION

This invention relates to the use of uplink signals for positioning or timing applications. It relates in particular to a User Equipment (UE) transmitting an uplink signal and that uplink signal being intercepted by another UE, for use in positioning or timing calculations.

BACKGROUND OF THE INVENTION

Known cellular positioning systems can be divided into two types:

In a downlink measurement system, the device (UE) makes measurements of the time of arrival of the downlink signals from the base stations (BSs), and the measurements are then processed in the device to find the position of the UE, or the measurements are passed up to a positioning engine in the network to find the position of the UE, Systems in which the device does the calculations are known as Mobile-Station-based (MS-based) systems. Those in which the measurements are forwarded to a positioning engine at a remote server are called MS-assisted systems.

A second kind of system uses uplink measurements by the network. In such uplink systems, a number of base stations (BSs) receive and measure the time of arrival of the uplink signals from the UE, and then these are processed to find the location of the UE.

It is common for a UE to be able to receive the downlink signals of multiple BSs, because the downlink signal can be transmitted with higher power. A disadvantage of downlink-measurement systems is that they require the UE to make the measurements. Uplink-measurement systems avoid the need for the UE to make measurements, but they require that the UE's uplink signal can be received by several BSs or additional measurement units in the network infrastructure. This may not be practical in some environments, because the uplink signal is lower power and may be too weak to be received at distant BSs (that is, at BSs other than the BS that is serving the UE).

SUMMARY OF THE INVENTION

The invention is defined by the claims. According to a first aspect of the invention, there is provided a second User Equipment, hereinafter UE, for intercepting a signal of a first UE in a wireless infrastructure network, the second UE comprising:

a first receiver, for intercepting a first uplink signal transmitted by the first UE, the first uplink signal being suitable for reception by a first base station, hereinafter BS, serving the first UE;

a transmitter, for transmitting a second uplink signal suitable for reception by a second base station, hereinafter BS, serving the second UE;

a second receiver, for receiving a first downlink signal from the second BS;
and
a processor, configured to:
obtain interception-assistance information relating to the first uplink signal, at least a portion of said interception-assistance information originating from the first UE;
control the first receiver to intercept the first uplink signal based on the interception-assistance information; and
measure at least one characteristic of the first uplink signal,
the processor being further configured to perform one of the following steps:
use the measured characteristic to assist in the calculation of a position or a time; and
send the measured characteristic to a remote electronic device, for use in assisting a calculation of a position or a time.

By intercepting the uplink signal of one UE at another UE, the system may increase the number of possible measurements of the same signal, thereby creating additional useful information for positioning and/or timing calculations. The "donor" first UE (transmitting the uplink signal) may be closer to the "listener" second UE (intercepting the uplink signal) than to a BS. Therefore, the received signal strength at the listener UE may be higher and the measurements made by the listener UE may accordingly be more reliable than traditional uplink measurements made by the network infrastructure.

The interception-assistance information originates from the first (donor) UE. This means that there is no need to rely on the network infrastructure to generate the interception-assistance information and manage its dissemination to second (listener) UEs. It also means that the first UE can be in control of which second UEs are able to intercept its uplink signal. Therefore, privacy and/or security can be improved. Additionally, the second (listener) UE is not limited to intercepting uplink signals from first UEs that are being served by the same BS as the second UE. Indeed, the first UEs and second UEs do not even need to be in the same wireless infrastructure network, because the first UE can choose to share the interception-assistance information with any second UE in any infrastructure network.

"Intercept" is used here in the sense that the first uplink signal is primarily intended to be received by the first BS for communications purposes. Another way to describe this is that the first receiver "overhears" the first uplink signal. For the avoidance of all doubt: the first uplink signal is not prevented from reaching the first BS.

Measuring at least one characteristic of the first uplink signal preferably comprises measuring a characteristic of the modulated uplink signal. This may include a characteristic of the uplink carrier signal and/or a characteristic of a detectable modulation that has been imposed on the uplink carrier signal. Detecting the modulation and measuring the characteristic may comprise at least partly demodulating the first uplink signal.

The first UE may be a mobile device or a fixed device. In some embodiments, the first UE may be an Internet-of-Things (IoT) device, or a Vehicle-to-Vehicle/Vehicle-to-Infrastructure (V2X) device. Optionally, the first UE may be configured for Machine-to-Machine (M2M) communication. That is, the first UE may be incorporated in a device whose primary function is not personal mobile communication. In some embodiments, the first UE is a mobile device incorporated in a vehicle. The position of the first UE may be unknown (at least prior to the calculation of a position).

Alternatively, in some embodiments, the position of the first UE may be known, and used to assist in the calculation of a position or time for another UE.

A position calculated according to an embodiment of the method is preferably specified in two dimensions, and optionally in three dimensions. However, in some cases it may be sufficient to specify a position in one dimension, such as an altitude.

When calculating a position, the position may be calculated in absolute terms—for example, in geographic coordinates (typically comprising latitude, longitude, and optionally altitude). Alternatively, the position may be calculated in relative terms—for example, as a position difference from a reference location or device. In some cases, the position may comprise a position difference in one dimension—that is, a separation distance from a reference location.

The interception-assistance information may comprise identity information of the first UE, parameters of the first uplink signal, or both. In some cases, the parameters of the first uplink signal may also comprise identity information of the first UE. For example, the interception-assistance information may comprise Medium Access Control (MAC) information associated with the first UE, which may both identify the first UE and comprise parameters of the first uplink signal.

The interception-assistance information is obtained in advance, before intercepting the first uplink signal, so that it can be used to help the first receiver to intercept the first uplink signal.

The first UE may generate the interception-assistance information and provide it to the second UE via a communications network, preferably comprising a wireless communications network. Alternatively, the interception-assistance information may be provided to the second UE from the first UE via an intermediary such as a server or service. Again, this may be done via a communications network, preferably comprising a wireless communications network. In some embodiments, the interception-assistance information may be provided through a supporting service, which gathers information about a plurality of first UEs.

In one embodiment, controlling the first receiver to intercept the first uplink signal based on the interception-assistance information may comprise controlling the first receiver to search for the first uplink signal using the interception-assistance information to guide the search.

The first receiver and the second receiver may be provided by the same physical hardware components in some embodiments, That is, it may be possible for a single receiver to receive both downlink signals and uplink signals. This will depend to some extent on the characteristics of the wireless infrastructure network in which each UE operates.

The first UE and second UE may be served by the same BS or different BSs. That is, the first BS and second BS may be the same BS or different BSs. The first UE and second UE may be operating in the same wireless infrastructure network or may be operating in different wireless infrastructure networks. In the latter case, the first BS and the second BS are BSs in different networks, for example controlled by different network operators.

The second UE may be a mobile device or a fixed device. In some embodiments, the second UE may be an Internet-of-Things (IoT) device, or a Vehicle-to-Vehicle/Vehicle-to-Infrastructure (V2X) device. Optionally, the second UE may be configured for Machine-to-Machine (M2M) communication. That is, the second UE may be incorporated in a device whose primary function is not personal mobile communication. In some embodiments, the second UE is a mobile device incorporated in a vehicle. The position of the second UE may be unknown (at least prior to the calculation of a position). Alternatively, in some embodiments, the position of the second UE may be known, and used to assist in the calculation of a position or time for another UE.

The processor may be further configured to measure at least one characteristic of the first downlink signal, and to either; use the measured characteristic of the first downlink signal to assist in the calculation of the position or the time; or send the measured characteristic of the first downlink signal to a positioning server, for use in assisting the calculation of the position or the time.

The processor may be further configured to send identity information of the second UE to the server for use in assisting a calculation of a position or a time.

The interception-assistance information may be provided from the first UE to the second UE (i) directly, by user plane data communication across a network; or (ii) indirectly, by user plane data communication from the first UE to an intermediary followed by user plane data communication from the intermediary to the second UE.

The first BS and second BS may be in different wireless infrastructure networks.

The processor may be configured to share interception-assistance information, relating to the second UE and/or the second uplink signal, with another UE before the second uplink signal is transmitted, to assist the other UE to intercept the second uplink signal.

In this way, the second UE can be a donor as well as a listener.

In some embodiments, the other UE may be the first UE.

In this way, a pair of bidirectional measurements, may be made between two UEs.

The processor may be configured to control the transmitter to transmit the second uplink signal in response to the first receiver intercepting the first uplink signal.

In this way, a round-trip measurement can be made (a pair of bidirectional measurements, with one measurement followed immediately by the other).

The interception-assistance information preferably comprises at least one or any combination of two or more of: identity information of the first UE; a position and/or velocity information of the first UE; information about one or more antennas used by the first UE to transmit the first uplink signal; general parameters of the first uplink signal; parameters of the first uplink signal that are specific to the first UE; general parameters of a second downlink signal transmitted by the first BS; and information that allows the second UE to receive and interpret configuration information for the first UE sent by the first BS in the second downlink signal.

In some embodiments, the identity information may comprise an identity address or label, which may be either permanently or temporarily assigned to the first UE. The identity information preferably allows the first uplink signal to be associated with a specific piece of physical equipment. A Cell Radio Network Temporary Identifier (C-RNTI) is an example of identity information of the first UE. A C-RNTI is an identification number assigned by a BS temporarily to each UE currently served by it.

Knowledge of the position of the first UE may provide useful interception-assistance information in a variety of ways. It can be helpful to indicate which UEs are in the vicinity, the likely ability of the second UE to receive and measure the first uplink signal, and the geographical distribution of the first UE around the second UE, which may be beneficial to take into account for undertaking a signal reception and measurement that gives a good position estimate, Knowledge of whether the device is stationary or moving (and if possible its speed/velocity) is also of assistance in estimating the length of integration possible (improving sensitivity), and a likely Doppler shift that can then be accounted for in the receiver.

General parameters of the first uplink signal are those that are also used for the uplink signals of all other UEs communicating with the first BS. These may include parameters such as the cellular channel allocation, including frequency and bandwidth.

Parameters of the first uplink signal that are specific to the first UE may include identity-specific radio information, such as Medium Access Control (MAC) level information, timing information, resource blocks used for the first uplink signal, coding information for the first uplink signal, and signatures for the first uplink signal. Specific parameters of the first uplink signal may also include information about data to be transmitted by the first UE in the first uplink signal.

The specific parameters of the first uplink signal may include information derived from the configuration information for the first UE sent by the first BS in the second downlink signal.

General parameters of the second downlink signal are parameters that would be used by any UE wishing to receive the second downlink signal. For example, this may include information about the channel used for the second downlink signal.

MAC level information may comprise one or any combination of two or more of: a channel, carrier frequency, bandwidth, and/or set of OFDM sub-carriers to be used for the first uplink signal; a time of transmission of the first uplink signal; a frame timing structure and/or sub-channel allocation of the first uplink signal; an actual timing of the frame; a timing advance of the first UE; a spreading code used in the first uplink signal; a code-phase of that spreading code; a time slot to be used by the first UE for a Random Access Channel (RACH) transmission; and one or more time and frequency resource blocks to be used by the first UE for an uplink data transmission.

In a wireless infrastructure network that uses Time Division Multiple Access (TDMA), a time of transmission of the first uplink signal may be predefined by the time slot in which the uplink signal will be transmitted, preferably compared with the system frame time. In some embodiments, the time of transmission, may be predefined relative to a reference clock, a second downlink signal received by the first UE from the first BS, or another received signal. In some embodiments, the time of transmission may be predefined as a precise time with respect to a reference clock, such as the clock of a Global Navigation Satellite System (GNSS).

MAC information associated with the first UE may also comprise information about the first BS, such as one or more of: identity information of the first BS; timing information of the first BS; a System Frame Number (SFN) of the first BS; and Downlink Control Information (DCI) of the first BS.

Information about coding may comprise a code, signature, format, or RACH preamble to be used by the first UE for a RACH uplink access request.

In some cases, the interception-assistance information may be specific information, that allows the first receiver to intercept a unique first uplink signal transmitted by a specific first UE in a specific time interval. Such information might not assist the first receiver to intercept any other first uplink signal—including other uplink signals transmitted by other first UEs, and other uplink signals transmitted by the same first UE. This kind of interception-assistance information may be thought of as low-level interception-assistance information. It may comprise MAC information on frequency channel, frame time-slot, and code used. It may be provided from the first UE to the second UE or the second UE may request the first UE to transmit the first uplink signal with these specific MAC parameters.

In other cases, the interception-assistance information may be generic information, pertaining to a plurality of first uplink signals and allowing the first receiver to intercept this plurality of first uplink signals. The plurality of first uplink signals may comprise different uplink signals transmitted by a single first UE at different times, or uplink signals transmitted by a plurality of first UEs (at the same or different times), or a combination of both. This generic information may be thought of as high-level interception-assistance information. It may comprise general channel configurational information, device or network scheduling information, device activity scheduling information from the first UE, or identity information (or a combination of two or more of these).

An advantage of high-level interception-assistance information is that it does not need to be transmitted for each measurement. This may help to reduce signaling and protocol traffic. It may be particularly advantageous for (i) tracking applications, in which repeated measurements of a UE's position are desired; and (ii) multi-target applications, such as Vehicle to Vehicle communications and positioning, in which the high-level information can be provided to multiple second UEs, which can then act autonomously to intercept uplink signals and measure their times of arrival, without the need for explicit individual instructions. This may help to reduce protocol overhead and time delay, compared with instructing each second UE separately.

The second UE may be configured to store high-level interception-assistance information in a memory, for subsequent reuse.

The at least one measured characteristic may comprise one of or any combination of two or more of: a time of arrival of the first uplink signal; a received signal strength of the first uplink signal; an angle of arrival of the first uplink signal; and a carrier phase of the first uplink signal.

Each of these measurements is useful for positioning and/or timing calculations. The measurements can be used in such calculations as are known in the art.

The at least one measured characteristic may comprise a difference between a characteristic of the first uplink signal and a corresponding characteristic of another signal.

The other signal may be an uplink signal transmitted by another UE and intercepted by the second UE, but this is not essential. In some embodiments, the other signal may be a signal transmitted by the second UE itself, including but not limited to the second uplink signal.

The at least one measured characteristic may comprise one of or any combination of two or more of: a time difference between the other signal and the arrival of the first uplink signal; a signal strength difference between the other signal and the first uplink signal: an angular difference between a direction of the other signal and a direction of the first uplink signal; and a phase comparison between a carrier phase of the first uplink signal and a carrier phase of the other signal.

The difference between the times of arrival of two signals can be useful for positioning and/or timing calculations.

Similarly, the difference between a time of arrival and a time of transmission may be useful. Similar considerations apply in respect of signal strength, signal direction, and carrier phase. Often, by using difference measurements, the need for an absolute reference (in time, power, direction, or phase) can be avoided.

The first uplink signal and the other signal may be at the same frequency or different frequencies. However, in the case of a phase comparison, the other signal and the first uplink signal are preferably at the same frequency.

The processor of the second UE may be configured to obtain the interception-assistance information from a supporting service as an intermediary or from the first UE without an intermediary service.

In either case, the interception-assistance information may be obtained via user plane data communication via the second BS.

The supporting service may be provided by a computer that calculates the position or time, or it may be provided by another computer.

The second UE may comprise a third receiver for receiving a second downlink signal from the first BS.

In some embodiments, the third receiver may be the same receiver as the first receiver and/or second receiver, or it may at least share some components with one or both of those receivers.

In some embodiments, the third receiver may share some or all of its physical hardware components with the second receiver, since both of these receivers are configured to receive downlink signals.

The processor of the second UE may be further configured to measure at least one characteristic of the second downlink signal, and to either: use the measured characteristic of the second downlink signal together with the measured characteristic of the first uplink signal to assist in the calculation of the position or the time; or send the measured characteristic of the second downlink signal and the measured characteristic of the first uplink signal to the server, for use in assisting the calculation of the position or the time.

Measurements of the first uplink signal together with the second downlink signal may be particularly useful in some circumstances. For example, it may allow a local clock offset of the first UE to be cancelled out in the calculation of the position or time, by forming a difference of the two measurements.

The processor may be configured to obtain some of the interception-assistance information by decoding the second downlink signal received from the first BS. Such information may include (optionally among other information) parameters of the first uplink signal that are specific to the first UE.

The second downlink signal is the downlink signal from the first BS to the first UE. This signal therefore contains useful configuration information defining parameters of the first uplink signal, as mentioned already above.

The interception-assistance information obtained from the second downlink signal may comprise at least one or any combination of two or more of: DCI comprising MAC information to be used for the first uplink signal; and a sounding allocation for a sounding signal to be sent by the first UE.

The processor may be configured to: obtain a first portion of the interception-assistance information from a supporting service or from the first UE; and use the first portion of the interception-assistance information to obtain a second portion of the interception-assistance information from the second downlink signal.

For example, the first portion of interception-assistance information may tell the processor which part of the second downlink signal to decode or how to decode it in order to obtain the second portion of interception-assistance information. In another example, the first portion of interception-assistance information may comprise information about the first BS, to help the third receiver detect, receive, or decode the second downlink signal.

The first portion may comprise high-level interception-assistance information, as summarised previously above. The second portion may comprise low-level interception-assistance information, as also summarised previously above.

The processor may be configured to control the first receiver to intercept the first uplink signal in response to an instruction received from a source external to the second UE.

In this case, the interception of the uplink signal and measurement of the characteristic are initiated by the external source, rather than by the second UE. The instruction may include some or all of the interception-assistance information.

The instruction may be received from a server or supporting service, from the first UE or some other UE.

In some embodiments, the supporting service instructs the second UE to listen for and intercept the first uplink signal from the first UE. The supporting service may know the timing and other parameters of the first uplink signal either because it has gathered this information from the first UE or because it has instructed the first UE to transmit the first uplink signal in a particular way. This can allow the measurement of the at least one characteristic to be made more efficiently and/or effectively, thanks to improved coordination and control of the transmission and/or reception of the first uplink signal. The same is true if the instruction comes from the first UE itself.

The second UE may be configured to send a request to the first UE or to a supporting service, to cause the first UE to transmit the first uplink signal to the first BS.

The request may comprise a message sent by user plane data communication over a network. Preferably, the message is sent as part of the second uplink signal.

The request may include parameters for the uplink signal to be transmitted by the first UE.

In this case the interception of the uplink signal and measurement of the characteristic are initiated by the second UE. The second UE requests the transmission of the first uplink signal in order that the second UE can intercept it and measure at least one characteristic.

In this example, the processor of the second UE may be able to measure the time of arrival of the first uplink signal more efficiently or effectively because the second UE caused it to be transmitted and can therefore predict the timing or other parameters of the first uplink signal more accurately.

The request may be sent by the second UE to the first UE via any suitable communication network. Alternatively, the request may be sent via any suitable communication network to the supporting service, which may then act as an intermediary between the second UE and the first UE.

Optionally, the request to the first UE may comprise timing and/or other parameters of the first uplink signal to be transmitted.

The first receiver and the second receiver may be provided by a common receiver and the processor may be configured to control the common receiver to switch between receiving the first downlink signal and intercepting the first uplink signal.

The common receiver may be controlled to receive the first downlink signal in a first time interval, and to intercept the first uplink signal in a second, different time interval.

Note that in some embodiments the third receiver is also provided by the common receiver.

The second UE may further comprise a GNSS receiver, wherein the processor is further configured to send GNSS positioning data from the GNSS receiver to an electronic device for positioning and/or timing calculations.

The processor may be configured to obtain the interception-assistance information via user plane data communication.

The processor may be further configured to report a device description to a computer providing a supporting service, wherein the device description describes an uplink-interception capability of the first receiver.

The reporting may include an indication of the type, frequency, and/or bandwidth of the uplink signals that can be intercepted by the first receiver.

According to a second aspect of the invention, there is provided a first UE for use in a wireless infrastructure network, the first UE comprising:

a transmitter, configured to transmit an uplink signal to a BS serving the first UE in the wireless infrastructure network;

a first receiver, configured to receive a downlink signal from the BS; and a processor, configured to share interception-assistance information, relating to the first UE and/or the uplink signal, with a second UE before the uplink signal is transmitted, to assist the second UE to intercept the uplink signal.

For the avoidance of doubt, in this context, "share with" means "send to".

The second UE may be a second UE as summarised previously above. Preferably, the interception-assistance information is shared by the first UE via the wireless infrastructure network—in particular, encoded in the uplink signal, as user plane data communication. The interception-assistance information that is shared may be of the same kind as the interception-assistance information obtained and used by the second UE summarised above. In some embodiments, the interception-assistance information may be shared with the second UE via an intermediary such as a supporting service.

In some embodiments, the processor is configured to share the interception-assistance information with a plurality of second UEs. This can help each of these devices to intercept the uplink signal, permitting multiple measurements of its characteristics to be made.

Optionally, the processor may be configured to share the interception-assistance information with a second UE that is a UE in a different wireless infrastructure network to the first UE. This can allow uplink signals to be measured between UEs that are not members of the same wireless infrastructure network. This can considerably increase the number of measurements that can be made and therefore improve the richness of information available for calculating positions and/or times.

The first UE may be configured to transmit the uplink signal in response to a received request.

The request may comprise a message received by user plane data communication over a network. Preferably, the message is received as part of the downlink signal.

The request may include parameters for the uplink signal to be transmitted by the first UE.

Preferably, the first UE is configured to share the interception-assistance information in response to the same received request.

The request may be received from a server or support service, from the second UE (with or without intermediary), from another UE (with or without intermediary), or from the wireless infrastructure network. If the request is received from the wireless infrastructure network and includes parameters for the uplink signal to be transmitted, then the first UE preferably shares these parameters with the second UE as part of the interception-assistance information.

Optionally, the received request may comprise timing and/or other parameters of the uplink signal to be transmitted. For example, the RACH format may be instructed, and/or the time of transmission may be scheduled or accurately set as a result of input from the requesting entity. This is an alternative to the first UE choosing these parameters itself and then reporting them to the second UE. This may, for example, facilitate efficient scheduling, may help to reduce power consumption of the receiver in the second UE, and may avoid the need to post-report the accurate time of transmission, if this is predefined in advance.

The processor may be further configured to send calculation-assistance information to an electronic device after the uplink signal has been transmitted, the calculation-assistance information describing one or both of: at least one characteristic of the transmitted uplink signal; and a position of the first UE.

This additional step may be useful if it is not possible to specify in advance the exact characteristics of the uplink signal, such as a predefined time of transmission for the uplink signal. The calculation-assistance information may comprise timing information, describing the time at which the uplink signal was transmitted by the first UE. Preferably, this timing information describes the time of transmission precisely, with respect to a known timing reference. The known timing reference may include but is not limited to one of the following: a clock of a GNSS system; a time of receipt by the first UE of a signal from the first BS; and a time of receipt of an overheard signal from a second UE. Knowing a precise time of transmission and other characteristics of the transmitted uplink signal can assist the second UE or the server in the calculation of a position or time.

The timing information may further comprise a timing advance of the first UE, as set by the BS serving the first UE.

The first UE may further comprise a GNSS receiver, wherein the processor is further configured to send GNSS positioning data from the GNSS receiver to the second UE or a computer, as calculation-assistance information.

Knowing the position of the second UE can assist the first UE or the computer to calculate position or time.

The processor may be further configured to report a device description to a second UE and/or to a computer providing a supporting service, wherein the device description describes an uplink-transmission capability of the transmitter and/or an ability of the first UE to respond to requests to transmit signals suitable for interception by the second UE.

According to a third aspect of the invention, there is provided an electronic device for positioning and/or timing calculations, comprising:

a memory; and
a processor, the processor being configured to:
  receive from a plurality of second UEs measured characteristics of uplink signals transmitted by a plurality of first UEs to their serving Base Stations and intercepted by the second UEs;

receive calculation-assistance information; and
use the measured characteristics and the calculation-assistance information to calculate a position of one or more of the UEs or a time at one or more of the UEs.

The electronic device may be a UE or a server computer, for example.

If the electronic device is a UE, then some of the calculation-assistance information may be available internally at the UE itself. For example, the position of the UE may be available internally. Likewise, calculation-assistance information pertaining to a characteristic of an uplink signal transmitted by the UE itself may be available internally at the UE.

Some of the second UEs may also be first UEs. That is, the plurality of second UEs may overlap with the plurality of first UEs.

The processor may be configured to obtain at least a portion of the calculation-assistance information from reports sent by the respective first UEs.

The processor may be configured to obtain at least a portion of the calculation-assistance information from reports sent by the respective second UEs.

The calculation-assistance information may comprise at least one or any combination of two or more of: at least one characteristic of each transmitted uplink signal; a position of at least one of the first UEs; and a position of at least one of the second UEs.

In a first UE or an electronic device as summarised above, the at least one characteristic of the transmitted uplink signal may comprise one of or any combination of two or more of: time of transmission of the transmitted uplink signal; a transmitted signal strength of the transmitted uplink signal; an antenna configuration used to transmit the uplink signal; an angle of departure of the transmitted uplink signal; and a carrier phase of the transmitted uplink signal.

The calculation-assistance information may also comprise any of the types of interception-assistance information summarised above. The electronic device uses the calculation-assistance information to help calculate the position or the time. Note that the second UEs may use the same assistance information or different assistance information to help them intercept the uplink signals transmitted by the first UEs.

Particularly preferred calculation-assistance information for calculating a position or time may comprise at least one or any combination of two or more of: identity information of one or more of the first UEs; a time of transmission of one or more of the uplink signals by the respective first UEs; a position of one or more of the first UEs; and position and/or timing information relating to the respective base stations serving one or more of the first UEs.

The time of transmission of the one or more uplink signals may be described by the time slot in which the uplink signal was transmitted, preferably compared with the system frame time. In some embodiments, the time of transmission may be described relative to a reference clock, the downlink signal received by the second UE from its serving BS, or another received signal. In some embodiments, the time of transmission may be described as a precise time with respect to a known timing reference. The known timing reference may include but is not limited to one of the following: a clock of a GNSS system; a time of receipt by the first UE of a signal from the first BS; and a time of receipt of an overheard signal from a second UE.

In a first UE or an electronic device as summarised above, the at least one characteristic of the transmitted uplink signal may comprise a difference between a characteristic of the transmitted uplink signal and a corresponding characteristic of another signal.

In a first UE or an electronic device as summarised above, the at least one characteristic of the transmitted uplink signal may comprise one of or any combination of two or more of: a time difference between the other signal and the transmission of the first uplink signal; a signal strength difference between the other signal and the first uplink signal; an angular difference between a direction of the other signal and a direction of the first uplink signal; and a phase comparison between the carrier phase of the transmitted uplink signal and a carrier phase of the other signal received at the first UE.

According to a fourth aspect of the invention, there is provided a computer for providing a supporting service for interception and measurement of uplink signals, the computer comprising:
a memory; and
a processor, configured to:
obtain interception-assistance information relating to uplink signals to be transmitted by a plurality of first UEs, from the first UEs; and
provide the interception-assistance information to a plurality of second UEs, to assist the second UEs to intercept the uplink signals so that the second UEs can measure one or more characteristics of the uplink signals for use in the calculation of a position or a time.

The interception-assistance information may be of the same kind summarised already above.

Optionally, the plurality of first UEs may comprise UEs in different wireless infrastructure networks.

The processor of the server computer may be further configured to instruct each first UE to transmit its uplink signal at a predefined time of transmission and/or with other predetermined parameters.

The parameters of the uplink signal may be the same as those summarised previously above.

The computer providing the supporting service may in some embodiments be implemented (in whole or in part) remotely from the first UEs and second UEs. In some embodiments, the computer providing the supporting service may be implemented (in whole or in part) by a local electronic device, including a UE providing such a support service for UEs in the vicinity.

The processor may be further configured to: instruct one of the first UEs to transmit an uplink signal; instruct one of the second UEs to intercept an uplink signal transmitted by another UE; and instruct one of the UEs to both transmit an uplink signal and to intercept another uplink signal.

The processor of the server computer may be further configured to instruct each second UE to intercept the uplink signals and measure their characteristics.

In some embodiments, the computer providing the supporting service may be the same as the electronic device for centralised positioning and/or timing calculations and may implement both functions. In other embodiments, these will be separate devices.

The processor may be further configured to receive from at least one of the first UEs or at least one of the second UEs a device description describing the ability of the device to transmit and/or intercept an uplink signal.

According to a fifth aspect of the invention, there is provided a method of gathering a measurement for assisting the calculation of a position or a time, the method comprising:

obtaining, from a first UE in a wireless infrastructure network, interception-assistance information relating to a first uplink signal to be transmitted by the first UE to a first BS serving the first UE;

intercepting the first uplink signal at a second UE, wherein the intercepting is assisted by the interception-assistance information;

measuring at least one characteristic of the intercepted first uplink signal at the second UE; and storing the measured characteristic for use in assisting the calculation of at least one of: a position of the first UE, a position of the second UE, a time at the first UE, and a time at the second UE.

The method preferably further comprises using the stored characteristic to assist in the calculation of at least one of: a position of the first. UE, a position of the second UE, a time at the first UE, and a time at the second UE.

The method may further comprise: intercepting the first uplink signal at a third UE, assisted by the interception-assistance information; measuring at least one characteristic of the intercepted first uplink signal at the third UE; and storing the measured characteristic for use in assisting the calculation of at least one of: a position of the first, second, or third UE, and a time at the first, second, or third UE.

This approach may be advantageous in that it can allow a time difference of arrival at the second UE and the third UE to be calculated, for example. Using a time difference of arrival may in some cases be more accurate and/or may allow the desired position or time to be calculated with less information about the first UE. For example, the time difference of arrival is independent of the transmission time of the first uplink signal by the first UE, Therefore, the precise transmission time does not need to be known. Potential uncertainties or tolerances in the time of transmission will therefore not affect the calculation.

Similar benefits are achievable with other characteristics, when using a difference measurement instead of an absolute measurement.

Preferably, the second UE and the third UE are located at different altitudes, and the method comprises calculating an altitude of the first UE. Alternatively, the second UE and the first UE may be located at different altitudes, and the method may comprise calculating an altitude of the third UE. Diversity in the altitude of the devices may be particularly advantageous because it can allow the altitude of another device to be calculated with greater precision. Determining the altitude of a device accurately by other means may be difficult. For example, downlink signals from base stations may be useful to calculate a horizontal position, but it may be difficult to calculate a vertical position (altitude) from such signals if the base stations are all mounted at approximately the same height (as is common).

In some cases, the or each measured characteristic may comprise a difference between a characteristic of the first uplink signal and a corresponding characteristic of another signal (as summarised previously above).

The method may further comprise: intercepting, at the first UE, a second uplink signal transmitted by a fourth UE to a second BS serving the fourth UE; measuring at least one characteristic of the intercepted second uplink signal at the first UE; and storing the measured characteristic of the second uplink signal, for use in assisting the calculation of the position or time.

In some cases, the fourth UE and the second UE may be the same UE.

The method preferably further comprises using the characteristic of the first uplink signal at the second UE and the characteristic of the second uplink signal at the first UE to assist in the calculation of at least one of: a position of the first UE, a position of the second UE, a time at the first UE, and a time at the second UE. The measured characteristic may in particular be a time of arrival. In general, it may be desirable to obtain calculation-assistance information comprising the times of transmission of the first and second uplink signals, for use in the calculation.

Preferably, the second uplink signal is transmitted by the second UE in response to receipt of the first uplink signal. More preferably, the second UE transmits the second uplink signal with a predetermined delay after the time of arrival of the first uplink signal. This can allow a "round-trip" time to the first UE to be calculated, which can in turn allow a separation between the two devices to be determined. In this case, the separation may be determined without needing to know the absolute times of transmission of the first and second uplink signals. This can help to minimize inaccuracies in the calculation caused by inaccuracies in the times of transmission.

The method may further comprise: obtaining information about a plurality of first UEs whose first uplink signals could be intercepted by the second UE; using the information to select a subset of the first UEs; intercepting, at the second UE, the first uplink signals from the first UEs in the selected subset; measuring at least one characteristic of each of these first uplink signals at the second UE; and using these measured characteristics to assist in the calculation of at least one of: a position of the second UE, a position of one of the first UEs in the selected subset, a time at the second UE, and a time at one of the first UEs in the selected subset.

The method may further comprise: intercepting, at the second UE, first uplink signals from a plurality of first UEs; measuring at least one characteristic of each of these first uplink signals at the second UE; obtaining information about the plurality of first UEs whose uplink signals have been intercepted; using the information to select a subset of the first UEs; and using the measured characteristics of the first uplink signals of the selected subset of the first UEs to assist in the calculation of at least one of: a position of the second UE, a position of one of the first UEs in the selected subset, a time at the second UE and a time at one of the first UEs in the selected subset.

The information used to select the subset may comprise at least one or any combination of two or more of: position information for some or all of the first UEs; motion information (optionally including a speed or velocity estimate) for some or all of the first UEs; identity information of each of the first UEs; for each of the first UEs, a time of transmission of its respective first uplink signal; for each of the first UEs, a frequency at which it transmits its respective first uplink signal; and network information for each of the first UEs, preferably identifying the wireless infrastructure network to which each UE belongs and the BS serving each UE.

The subset of the first UEs may be selected by at least one of: selecting first UEs whose positions are known; selecting first UEs whose positions are distributed in at least two orthogonal dimensions; selecting first UEs whose positions are distributed in altitude; selecting first UEs which are stationary; selecting the first UEs whose speed is lowest; selecting the first UEs whose uplink signals are intercepted with the highest signal-to-noise ratio by the second UE; and selecting the first UEs for which the time of arrival of the uplink signal can be measured most accurately.

Selecting UEs whose positions are known is useful because it can allow the absolute position of the second UE to be established.

Selecting UEs whose positions are distributed in at least two orthogonal dimensions can increase geometrical diversity, to facilitate trilateration.

Altitude may be defined in terms of absolute elevation (coordinate WGS84), in relative terms (for example, height above ground level, or relative to the height of another device whose height might not be known), or in logical terms, (for example, floor number in a building or level number in a multi-storey car park).

Preferably, the subset of first UEs includes UEs distributed in the vertical dimension. This can help to determine the position of the second UE in the vertical dimension. This can provide important position information that is difficult to obtain by other means. Commonly, base stations are well distributed horizontally, but are located at a similar height/altitude, so they give poor vertical information. A UE could be deliberately placed in a known position at a different height from the base stations, to act as an "anchor"—sharing interception-assistance information and transmitting an uplink signal, for measurement by other UEs in the vicinity. These other UEs could conceivably be members of multiple different wireless infrastructure networks. Particularly in industrial applications, where the positioning facility is provided for a site or building, this makes deployment cost-effective (rather than needing a building-owner to arrange the installation of a separate anchor UE for each wireless infrastructure network operator used by a UE in the building). This can provide versatility, flexibility, and future-proofing (for example, allowing changes of network operator).

To select first UEs for which the time of arrival of the uplink signal can be measured most accurately, the method may comprise analysing the shape of a correlation peak to detect multipath conditions, or detecting multipath conditions in some other way. Alternatively or in addition, the method may comprise determining the base station timing drift, and selecting UEs that are associated with the BSs having the least timing drift. This may be useful because drift in the base station timing also introduces uncertainty in the knowledge of the time of transmission the uplink signal, relative to UTC or any other base station.

Selecting the subset of the first UEs may comprise selecting first UEs whose positions are distributed in altitude, and wherein the method comprises calculating an altitude of the second UE.

The method may further comprise determining whether the second UE is authorised to obtain the interception-assistance information and, if so, providing the interception-assistance information to the second UE.

Determining whether the second UE is authorised may comprise: obtaining permission information defining a group of UEs authorised to obtain the interception-assistance information; obtaining identity information of the second UE; and comparing the identity information with the permission information, wherein the second UE is determined to be authorised if the identity information matches the permission information.

The method may further comprise: obtaining, interception-assistance information originating from a fifth UE relating to a third uplink signal to be transmitted by the fifth UE to a third BS serving the fifth UE; intercepting the third uplink signal at the second UE, wherein the intercepting is assisted by the interception-assistance information; determining a difference between the at least one characteristic of the intercepted first uplink signal and at least one corresponding characteristic of the intercepted third uplink signal at the second UE; and storing the determined difference for use in assisting the calculation of at least one of: a position of the first, second, or fifth UE, and a time at the first, second, or fifth UE.

In some embodiments, the fifth UE may be the same UE as the fourth UE.

Also provided is a non-transitory computer-readable medium comprising a computer program comprising computer program code adapted to control one or more physical computing devices to execute all of the steps of a method as summarised above, when said program is run.

The one or more physical computing devices may include processors of one or more UEs and processors of one or more server computers.

In a second UE, first UE, electronic device, computer, method, or non-transitory computer-readable medium summarise above, the or each first UE is a UE in a wireless infrastructure network, said wireless infrastructure network preferably being a cellular network.

Embodiments of the invention may be used to particular advantage in the context of cellular networks because in these networks it may be particularly difficult to intercept the uplink signal transmitted by a first UE and to use it for positioning or timing calculations, in the absence of assistance information. That is, the sharing, gathering, and use of assistance information may be particularly useful in relation to UEs in cellular networks.

Note that where multiple UEs are involved, these may be UEs in the same cellular network or in different cellular networks.

In a first UE, second UE, electronic device, computer, method, or non-transitory computer-readable medium as summarised above, the first uplink signal is preferably a TDMA signal, transmitted only in a finite time interval.

The same applies to the other uplink signals mentioned. In this way, an "uplink signal" refers to a specific, time-limited burst of transmission, with a unique time of transmission at the transmitter and a unique time of arrival at the receiver. In TDMA systems, each UE typically transmits an uplink signal periodically, in a defined time slot. The uplink signal here refers to a single instance of such a transmission.

According to a further aspect, there is provided a method of gathering a measurement for assisting the calculation of a position or a time, the method comprising:

instructing, by a second UE, a first UE in a wireless infrastructure network to transmit a first uplink signal to a first BS serving the first UE, wherein the second UE instructs the first UE to transmit the uplink signal with one or more defined characteristics;

intercepting the first uplink signal at the second UE, wherein the intercepting is assisted by knowledge of the one or more defined characteristics;

measuring at least one characteristic of the intercepted first uplink signal at the second UE: and storing the measured characteristic for use in assisting the calculation of at least one of: a position of the first UE, a position of the second UE, a time at the first UE, and a time at the second UE.

In this method, the knowledge of the defined characteristics that were included in the transmission-instruction replaces the interception-assistance information in the fifth aspect, summarised above. All other features of the fifth aspect may be preserved and thus the further aspect can be combined with any of the subsidiary features discussed above in relation to the fifth aspect. It can also be combined with the relevant features of the other aspects, in the same way as the fifth aspect.

In particular, the one or more defined characteristics may comprise any one, or any combination of two or more, of: a time at which the first uplink signal is to be transmitted; a signal strength with which the first uplink signal is to be transmitted; an antenna configuration to be used to transmit the first uplink signal; an angle of departure at which the first uplink signal is to be transmitted; and a carrier phase with which the first uplink signal is to be transmitted.

Alternatively, or in addition, the one or more defined characteristics may comprise any one or any combination of two or more of: a time difference between another signal and the time at which the first uplink signal is to be transmitted; a signal strength difference between a signal strength of another signal and the signal strength with which the first uplink signal is to be transmitted; an angular difference between a direction of another signal and an angle of departure at which the first uplink signal is to be transmitted; and a phase comparison between a carrier phase of another signal and a carrier phase with which the first uplink signal is to be transmitted.

The second UE may instruct the first UE without intermediary, or using a supporting service as an intermediary.

BRIEF DESCRIPTION OF THE DRAWINGS

The invention will now be described by way of example with reference to the accompanying drawings, in which.

DETAILED DESCRIPTION

As used herein, a "wireless infrastructure network" is defined as a wireless network that is organised in a hierarchical manner, comprising one or more UEs, wherein each UE communicates with and is served by a BS. The communications between each UE and its serving BS are controlled by the BS. Typically, access to the wireless medium is strictly controlled by the BS, which is responsible for coordinating and orchestrating the PHY and MAC layers. Direct, spontaneous, radio communication between UEs is typically not allowed. (Such mechanisms may be arranged and managed by the network, but are not the subject of the present invention.)

A cellular network is one important example of a wireless infrastructure network. But many other types of Wireless Wide Area Network (WWAN) are also organised in this way. Examples include: Random Phase Multiple Access (RPMA), LoRaWAN, and sigfox.

In the following description, for simplicity and clarity, it will be assumed that the wireless infrastructure network in which each UE operates is a cellular network. This is indeed a preferred embodiment but it is just one example of a wireless infrastructure network. It will be understood that the scope of the invention is not limited to cellular networks.

Figure 1:
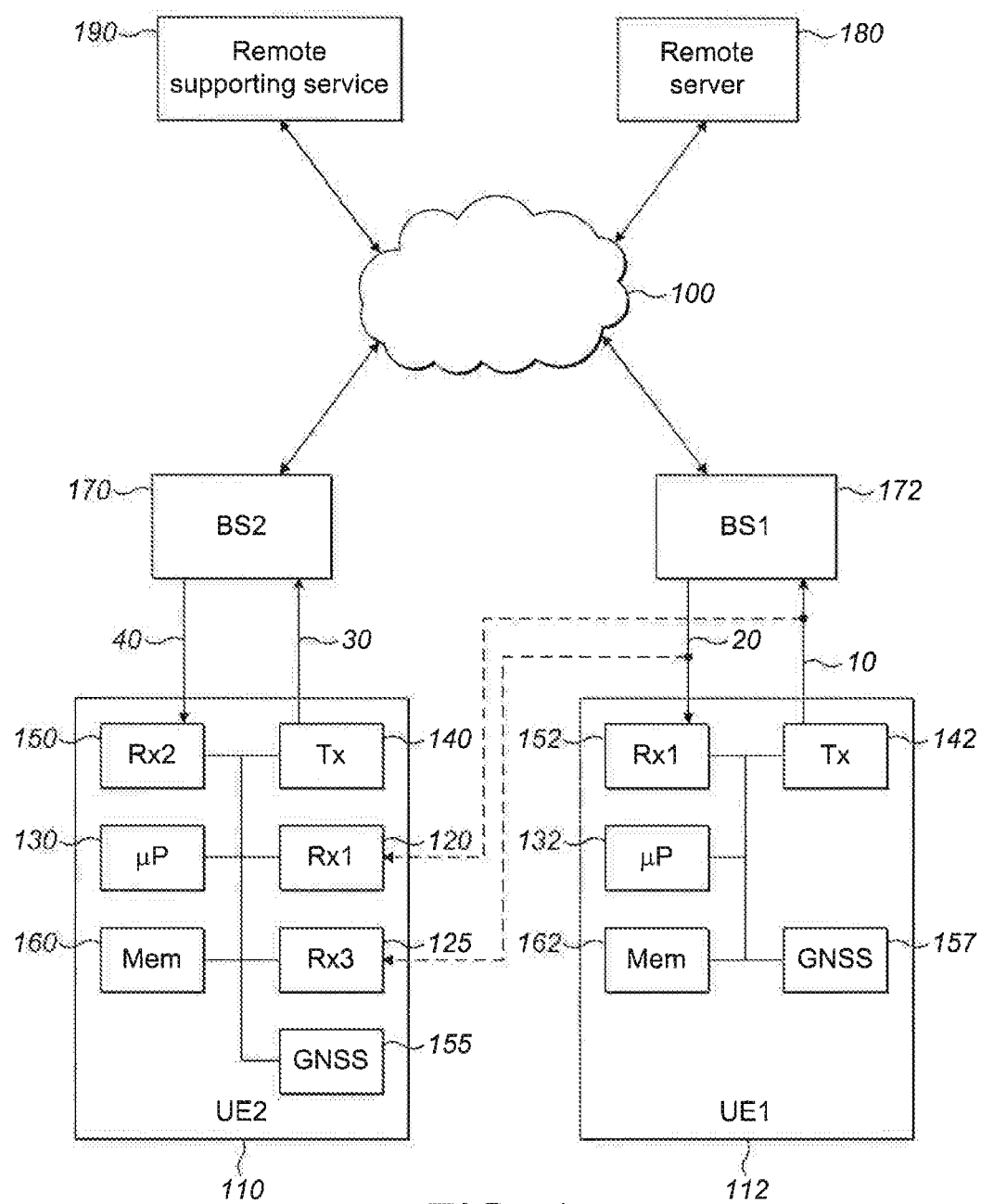
FIG. 1 is a block diagram of a system operating according to an embodiment of the invention.

FIG. 1 is a block diagram of a system operating according to an embodiment of the invention. The system includes a first user equipment (UE) 112, served by a first base station (BS) 172. A second UE 110 is configured to intercept an uplink signal 10 transmitted by the first UE 112 to the first BS 172. The second UE 110 is served by a second BS 170.

The system also includes a remote server 180, which is an example of an electronic device configured to calculate a position and/or time. It further includes a remote supporting service 190 configured to provide a supporting service for measurements by the second UE 110 and optionally other UEs. Note that, although shown separately, the remote server 180 and the remote supporting service 190 may be provided by the same server computer.

The remote server 180; the remote supporting service 190; and the two base stations 170, 172 are coupled to a network 100. In different embodiments, this may be a public or private, wired or wireless network, or a combination of different networks of different types. For example, the network 100 may comprise parts of the infrastructure of one or more cellular networks and/or may comprise part of the Internet. The first UE 112 and the second UE 110 are communicatively coupled to the remote server 180 and the remote supporting service 190 via the respective base stations 172, 170 and the network 100. For example, the first UE 112 may communicate with the remote supporting service 190 and remote server 180 using user plane data transmitted via a cellular data connection with the first base station 172 and via the network 100. The first and second UEs may also be able to communicate with one another in the same way.

In some circumstances it may be advantageous if the first and second BSs 172, 170 are part of the same cellular network, but this is not necessary in general.

The first UE 112 will now be described in greater detail. The first UE comprises a transmitter 142 that is configured to transmit a first uplink signal 10 to the BS 172. It also comprises a first receiver 152 configured to receive a second downlink signal 20 from the BS 172. A processor 132 in the first UE 112 is configured to share interception-assistance information with the second UE 110, before the first UE 112 transmits the first uplink signal 10, in order to help the second UE 110 to intercept the first uplink signal. The first UE 112 may provide the interception-assistance information to the second UE via the network 100 without an intermediary. Alternatively, the first UES 112 may provide the interception-assistance information to the remote supporting service 190 via the network 100 and the remote supporting service 190 may pass the interception-assistance information on to the second UE 110 via the network 100.

The first UE 112 may transmit the first uplink signal 10 at a time and with uplink signal parameters negotiated between the first UE 112 and the BS 172. Alternatively or in addition, the timing or other parameters of the first uplink signal may be influenced by one or more of: the remote supporting service 190; and the second UE 110. In some embodiments, the first UE 112 may receive a request to transmit the first uplink signal and may transmit the first uplink signal in response to that request.

The processor 132 may be further configured so that, after the first UE 112 has transmitted the first uplink signal, the processor reports calculation-assistance information, such as the time of transmission or other characteristics of the transmitted uplink signal. The report may be sent to one or both of the remote server 180 and the second UE 110. The reported calculation-assistance information may be useful in position or timing calculations using methods according to embodiments of the invention.

The first UE 112 also comprises a GNSS receiver 157 and a memory 162. The processor 132 may be configured to obtain GNSS positioning data from the GNSS receiver and either store it in the memory 162 or send it to the second UE 110 or the remote server 180, as further calculation-assistance information. When satellite signals are available, the positioning data obtained in this way may be useful for calculating the position or time at other devices, using methods according to embodiments of the invention.

The second UE 110 will now be described in greater detail. It comprises a first receiver 120 configured to intercept the first uplink signal 10 transmitted by the first UE 112. A processor 130 of the second UE 110 is configured to obtain interception-assistance information to help the first receiver 122 intercept the first uplink signal. The interception-assistance information originates from the first UE 112. It may be obtained by the second UE 110 from the remote supporting service 190 as an intermediary; or from the first UE 112, without intermediary.

Having obtained the assistance information, the processor 130 controls the first receiver 120 to intercept the first uplink signal, using the interception-assistance information. The processor 130 measures at least one characteristic of the first uplink signal 10 at the first receiver 120. In the present example, the measured characteristic is the time of arrival. This time of arrival may be used in a method of calculating a position or time according to embodiments of the invention. This calculation may be performed by the processor 130 or by the remote server 180. In the latter case, the processor 130 may store the time of arrival temporarily in a memory 160 of the second UE 110, before sending the time of arrival to the remote server 180.

The second UE 110 further comprises: a transmitter 140, for transmitting a second uplink signal 30 to the second BS 170; and a second receiver 150, for receiving a first downlink signal 40 from the second BS 170. The processor 130 may be further configured to measure the time of arrival (or another characteristic) of the first downlink signal 40 at the second receiver 150. This may also be useful for calculating a position or time using methods according to embodiments of the invention.

The second UE 110 further comprises a third receiver 125 configured to receive the second downlink signal 20 transmitted by the first BS 172, Some of the interception-assistance information for intercepting the first uplink signal may be obtained from the second downlink signal 20. The processor 130 may be configured to measure the time of arrival (or another characteristic) of the second downlink signal. Once again, this may be useful for calculating a position or time in methods according to embodiments of the invention.

The processor 130 may be configured to control the first receiver 120 to intercept the first uplink signal 10 in response to an instruction received from outside the second UE 110. For example, the instruction may be generated and sent by the first UE 112 or the remote supporting service 190. This may be appropriate if the processor 130 would not otherwise be aware of when to try to intercept the first uplink signal.

On the other hand, the processor 130 may be configured to send a request to cause the first UE 112 to transmit the first uplink signal. The request may be sent to the first UE 112 or to the remote supporting service 190. In some cases, the request may be more detailed in that it may include requested parameters of the first uplink signal. The more the second UE 110 can dictate the timing, form, and/or content of the first uplink signal, the less assistance information it may require to intercept it successfully. In general, there may be a variety of ways to negotiate the parameters of the first uplink signal, involving any of: the first UE 112, the second UE 110, and the remote supporting service 190.

In this embodiment, the second UE 110 also includes a GNSS receiver 155. The processor 130 is configured to send positioning data from the GNSS receiver 155 to the remote server 180, where it can provide calculation-assistance information for calculating a position or time in methods according to embodiments of the invention.

As mentioned already above, the positioning or timing calculation may be carried out by the second UE 110 or by the remote server 180. Alternatively or in addition, in some embodiments, it may be carried out by the first UE 112. If it is to be carried out by the second UE 110 then, after the first uplink signal has been intercepted, the processor 130 may obtain calculation-assistance information describing one or more characteristics of the transmitted first uplink signal, such as its time of transmission. This information may be useful in the positioning or timing calculation.

Similarly, if the calculation is to be carried out by the remote server 180, then the remote server may obtain the same calculation-assistance information, after the first uplink signal has been transmitted by the first UE 112.

Figure 2:
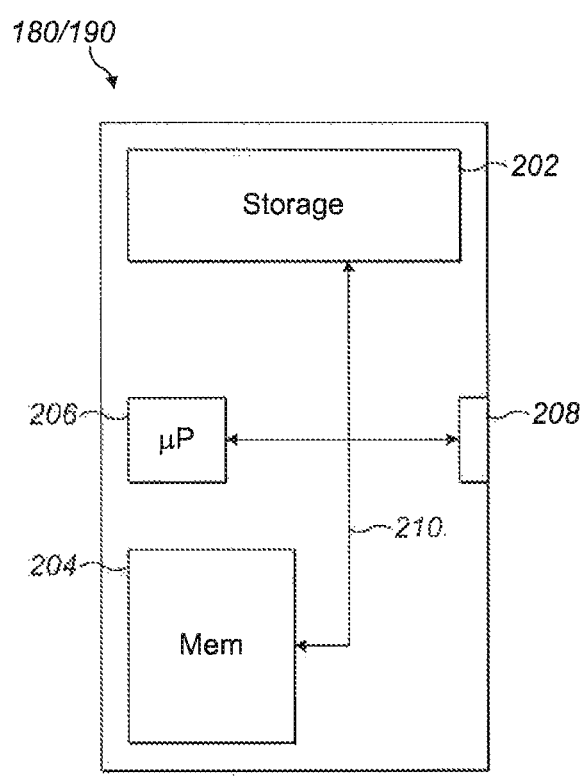
FIG. 2 is a block diagram of a server computer configured to execute a method according to an embodiment.

FIG. 2 is a block diagram of an exemplary server computer according to an embodiment. This may implement the functions of the remote server 180 or the remote supporting service 190. For simplicity, it will be assumed below that both the remote server 180 and the remote supporting service 190 are implemented by the same server computer. Of course, this is not essential and the scope of the invention is not limited in this way. In general, the functions of the remote server 180 (and/or the remote supporting service 190) may be performed by any electronic device or computer having the relevant processing, storage, and communication capabilities.

The exemplary server 180/190 comprises a computer-readable storage medium 202, a memory 204, a processor 206 and one or more interfaces 208, which are all linked together over one or more communication busses 210. The exemplary server 180/190 may take the form of a conventional computer system, such as, for example, a desktop computer, a personal computer, a laptop, a server, a mainframe computer, and so on.

The computer-readable storage medium 202 and/or the memory 204 may store one or more computer programs (or software or code) and/or data. The computer programs stored in the computer-readable storage medium 202 may include an operating system for the processor 206 to execute in order for the server 180/190 to function. The computer programs stored in the computer-readable storage medium 202 and/or the memory 204 may include computer programs according to embodiments of the invention or computer programs that, when executed by the processor 206, cause the processor 206 to carry out a method according to an embodiment of the invention The processor 206 may be any data processing unit suitable for executing one or more computer readable program instructions, such as those belonging to computer programs stored in the computer-readable storage medium 202 and/or the memory 204. As part of the execution of one or more computer-readable program instructions, the processor 206 may store data to and/or read data from the computer-readable storage medium 202 and/or the memory 204. The processor 206 may comprise a single data processing unit or multiple data processing units operating in parallel or in cooperation with each other.

The one or more interfaces 208 may comprise a network interface enabling the server 180/190 to communicate with the first and second BSs 172, 170 across the network 100. The network may be any kind of network suitable for transmitting or communicating data from one computer system to another. For example, the network could comprise one or more of a local area network, a wide area network, a metropolitan area network, the internet, a wireless communications network, and so on. The server 180/190 may communicate with other computer systems over the network via any suitable communication mechanism/protocol. The processor 206 may communicate with the network interface via the one or more communication busses 210 to cause the network interface to send data and/or commands to another computer system over the network 100. Similarly, the one or more communication busses 210 enable the processor 206 to operate on data and/or commands received by the server 180/190 via the network interface from other computer systems over the network.

It will be appreciated that the architecture of the server 180/190 illustrated in FIG. 2 and described above is merely exemplary and that systems having different architectures using alternative components or using more components (or fewer) may be used instead.

In order to perform the functions of the remote server 180, the processor 206 is configured to receive from a plurality of second UEs 110 measured characteristics of uplink signals transmitted by a plurality of first UEs 112 to their serving Base Stations 172 and intercepted by the second UEs 110. In the present example, these measured characteristics comprise times of arrival. The processor 206 is further configured to receive calculation-assistance information relating to the uplink signals; and to use the times of arrival and the calculation-assistance information to calculate a position of one or more of the UEs 110, 112 or a time at one or more of the UEs 110, 112.

In order to perform the functions of the remote supporting service 190, the processor is configured obtain interception-assistance information relating to uplink signals to be transmitted by a plurality of first UEs 112; and provide the interception-assistance information to a plurality of second UEs 110, to assist the second UEs 110 to intercept the uplink signals so that they can measure characteristics (such as times of arrival) of the uplink signals for use in the calculation of a position or a time.

Note that, in general, some of the first UEs may be second UEs and vice versa. That is, they may both transmit uplink signals for interception by other devices and may intercept uplink signals transmitted by other devices. Likewise, they may be both donors and recipients of interception-assistance information.

The processor 206 may be configured to instruct each first UE 112 to transmit its uplink signal. Similarly, the processor 206 may be configured to instruct each second UE 110 to intercept the uplink signals and measure their characteristics. Thus, the processor 206 of the remote server 180 or a remote supporting service 90 may coordinate the distributed execution of methods according to embodiments of the invention.

Figure 3:
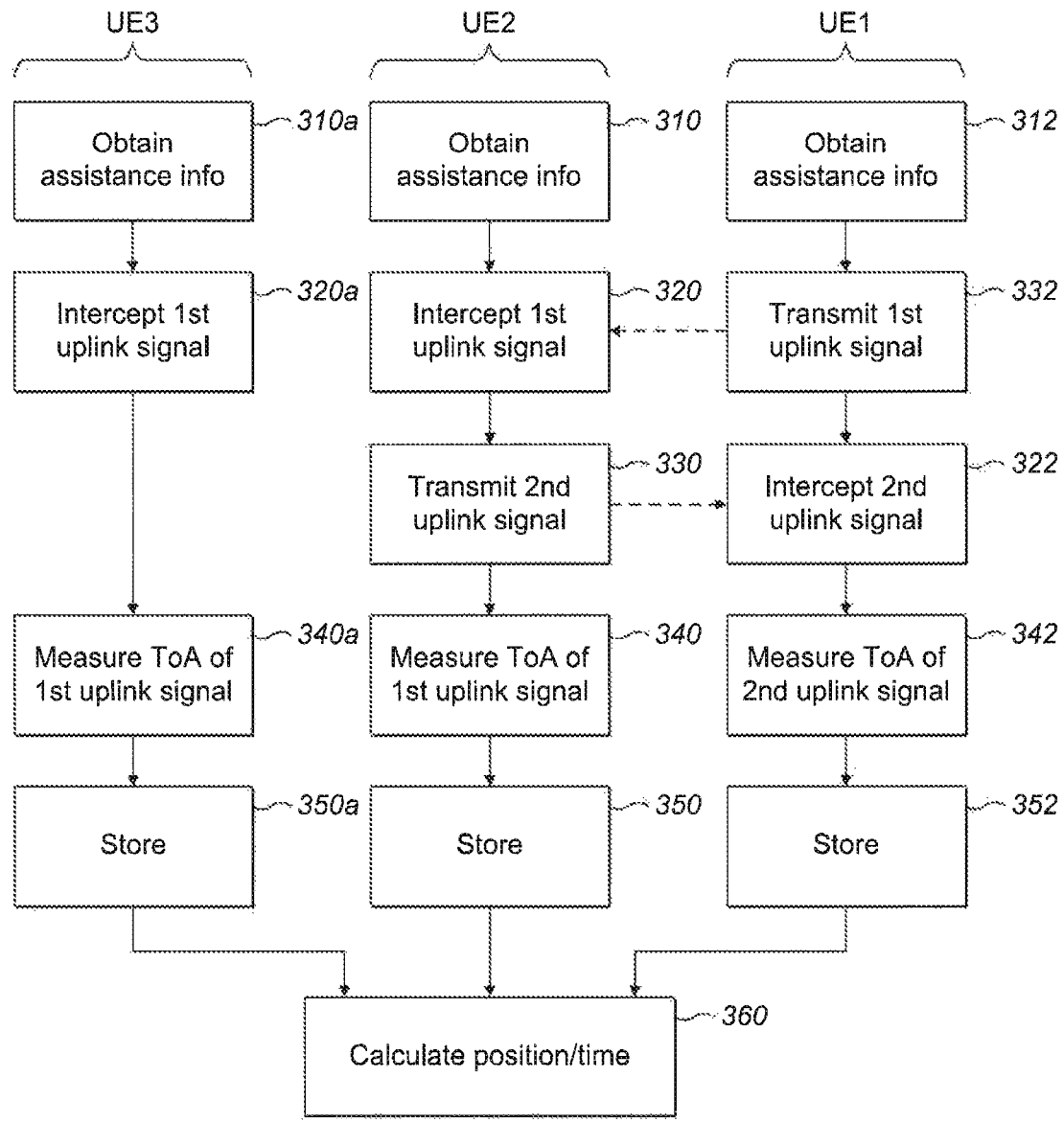
FIG. 3 is a flowchart illustrating a method of gathering a measurement for assisting the calculation of a position or time according to an embodiment.

FIG. 3 illustrates a method of gathering a measurement for assisting the calculation of a position or time according to an embodiment. The method comprises a first sequence of steps to be performed at the second UE 110. In step 310, the second UE 110 obtains, from the first UE 112, interception-assistance information relating to a first uplink signal 10 to be transmitted by the first UE 112. In step 320, the second UE 110 uses the interception-assistance information to intercept the first uplink signal 10. In step 340, the second UE 110 measures the time of arrival (ToA) of the first uplink signal. Note that, in other embodiments, the second UE 110 may measure other characteristics of the uplink signal as well as or instead of its time of arrival. Subsequently, in step 350, the second UE 110 stores the measured ToA (or other characteristic) for use in calculating a position or time. The stored ToA (or other characteristic) is used to calculate the position or time in step 360.

Optionally, in step 330, the second UE 110 transmits a second uplink signal, which may be intercepted by the first UE 112. Preferably this transmission is in response to the interception of the first uplink signal transmitted by the first UE 112.

The method preferably comprises a second sequence of steps to be performed at a third UE. These steps 310a, 320a, 340a, and 350a are substantially the same as the steps 310, 320, 340, and 350 performed by the second UE 110, as described above. Thus, the third UE makes a further time of arrival measurement of the first uplink signal. Having multiple independent time of arrival measurements of the same uplink signal, from devices which are—in general—located in different positions, may be advantageous to support the calculation in step 360. Note that, as for the second UE, the third UE may measure other characteristics of the uplink signal in addition to or instead of time of arrival, and these characteristics may be used to support the calculation in step 360.

The method preferably comprises a third sequence of steps to be performed at the first UE 112. In step 312, the first UE 112 obtains, from the second UE 110, interception-assistance information relating to the second uplink signal 30 to be transmitted by the second UE 110. In step 332, the first UE 112 transmits the first uplink signal 10. In step 322, the first UE 112 uses the interception-assistance information obtained in step 312 to intercept the second uplink signal 30 transmitted by the second UE 110. In step 342, the first UE 112 measures the ToA of the second uplink signal. In step 352, this ToA is stored. It can be used, together with the other ToAs, in the calculation of step 360. Once again, it may be useful for the first UE 112 to measure other characteristics of the second uplink signal as well as or instead of its time of arrival. It is particularly preferred that the first UE makes the same set of measurements on the second uplink signal as the second UE makes on the first uplink signal. It may also be preferred that the third UE makes the same set of measurements.

Although not shown in FIG. 3, the third UE may intercept and measure characteristics of the second uplink signal transmitted by the second UE, to increase the number of measurements available for the calculation. The third UE may also transmit an uplink signal that is then intercepted by one or both of the first UE and the second UE.

Figure 4:
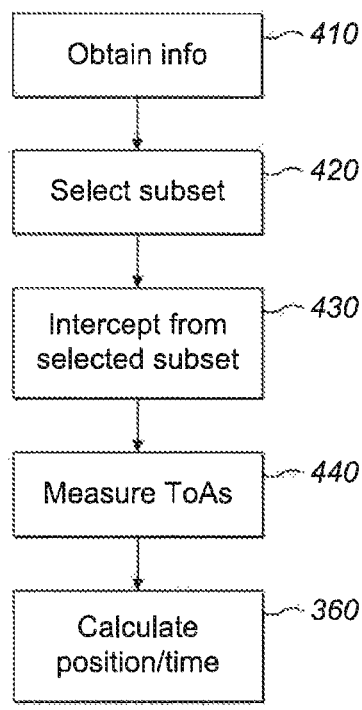
FIG. 4 is a flowchart illustrating an optional extension to the method of FIG. 3.

An optional refinement to the method of FIG. 3 is illustrated in FIG. 4. In step 410, the second UE 110 obtains information about a plurality of first UEs 112 whose first uplink signals it might wish to intercept. In step 420, the second UE 110 uses this information to select a subset of the first UEs 112 which may provide the best basis for the positioning or timing calculation. In step 430, the second UE 110 intercepts only those first uplink signals that were transmitted by UEs in the selected subset. This can avoid the unnecessary effort of intercepting less useful first uplink signals. In step 440, the second UE 110 measures the ToA (and/or other characteristics) of each of the selected first uplink signals. These measurements are then used in the calculation in step 360.

Figure 5:
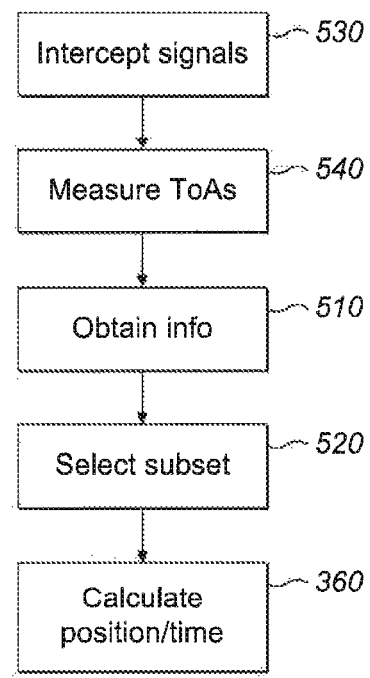
FIG. 5 is a flowchart illustrating an alternative optional extension to the method of FIG. 3.

An alternative version of this refinement is illustrated in FIG. 5. In step 530, the second UE 110 intercepts all available first uplink signals. In step 540, the second UE 110 measures the respective ToA (and/or other characteristics) of each first uplink signal. Then, in step 510, the second UE 110 obtains information about only those first UEs 112 whose uplink signals it has intercepted. This can avoid the unnecessary effort of obtaining information about other first UEs 112. In step 520, the second UE 110, uses the obtained information to select a subset of the first UEs. The measurements of this selected subset are then used in the calculation in step 360.

In the following, a number of examples of embodiments of the invention will be described in greater detail. For the avoidance of confusion, it should be noted that a UE may also be referred to as a modem.

Figure 6:
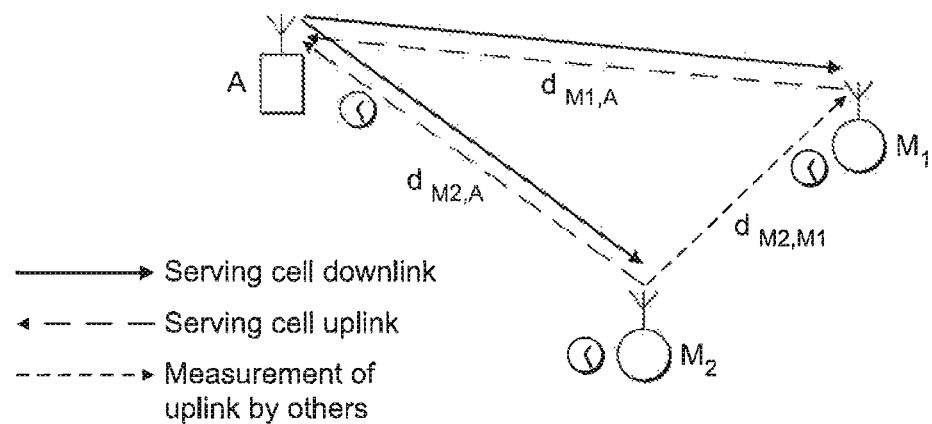
FIG. 6 illustrates time of arrival measurement of the uplink transmissions of neighbouring modems.

According to embodiments of the present invention a modem listens for, receives, and measures at least one characteristic of the uplink signal from a neighbour modem. This importantly gives timing (or carrier phase, or signal strength) measurements related to the distances between modems, as illustrated in FIG. 6, or directional measurements related to the angles subtended between the signal paths. In FIG. 6, the distance between two devices x and y is denoted $d_{xy}$. The downlink signal from the serving cell BS is denoted by solid arrows. The serving cell uplink signals are denoted by large dashed arrows. The interception of an uplink signal by another modem is indicated by the small dashed arrow. In this example, the listening modem $M_1$ receives and measures the time of arrival of the uplink signal transmitted to the base station by the neighbouring donor modem $M_2$, giving a measurable that depends on the separation of the two modems.

The principle of measuring distance between devices for positioning is powerful for collaborative/cooperative positioning of a number of devices in a locality. It is particularly suitable for difficult areas, where the position of a fraction of the devices is known in advance (in the case of fixed devices) or can be estimated (for example by GNSS).

The use of neighbours' uplink signal positioning in cellular systems gives particular benefits. It allows the use of existing signals, with no need for additional band allocations or approvals, or investments in infrastructure. Although not originally designed for positioning purposes, some signals are reasonably suitable for measuring time of arrival, often being strong in power (as the source is nearby) and fairly wide in bandwidth (supporting high bit rate connectivity) and having good correlation properties (designed for multiple access systems, or for channel estimation).

However there are also challenges. The uplink is often on a different frequency to the downlink, requiring a more capable receiver able to receive also the uplink signal channel. Additional processing may be required in the receiver, to decode the uplink signal, and extract synchronisation and identity information. The measurement of the time of arrival of the uplink signal may be challenging. Knowledge about the time of transmission of the uplink signal by the neighbour device may be necessary or advantageous. The system may need to support sharing or combining of information in a positioning engine to estimate the unknown location and timings of the devices involved.

Positioning based on intercepting uplink signals is beneficial in a variety of applications for cellular systems. The following examples illustrate different aspects of its use. Note that in FIGS. 7-10, discussed below, the flow of assistance information is not shown in the drawings, for reasons of clarity.

Figure 7:
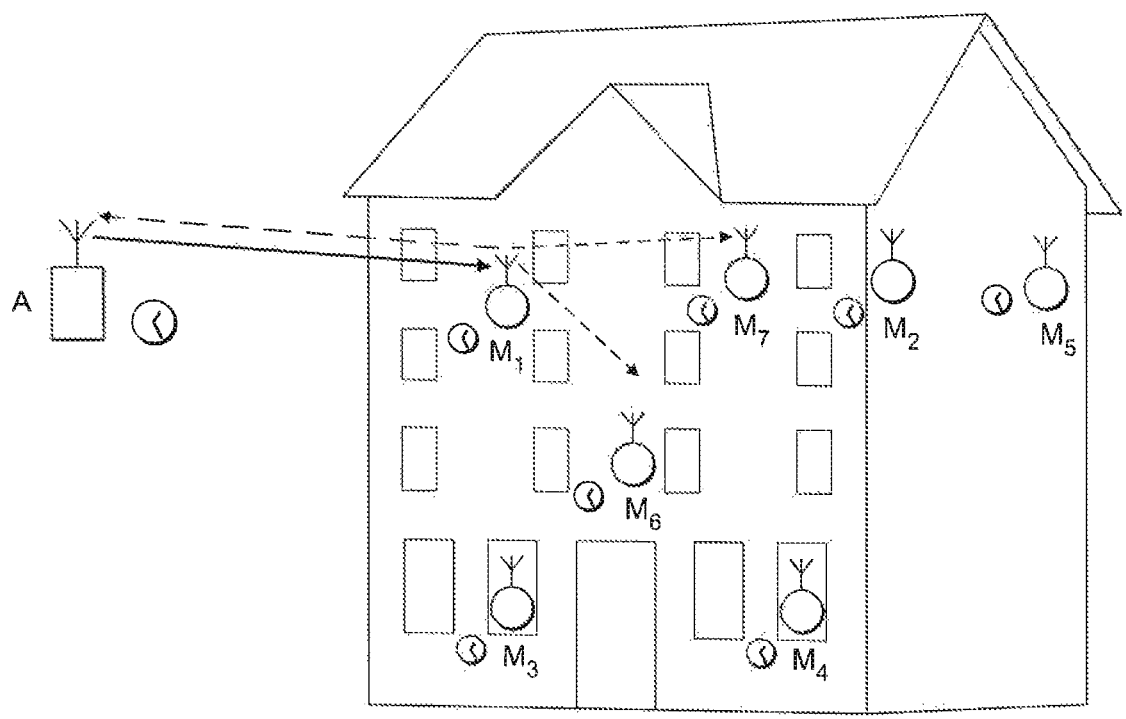
FIG. 7 illustrates neighbour uplink positioning of assets in a building.

FIG. 7 shows an example of using neighbour uplink positioning to determine the position of assets in a building. In this application, some modems ($M_1$ to $M_5$) act as references, fixed in known positions around the building, acting as anchors (listening modems) or beacons (transmitting donor modems). The positions of the mobile devices ($M_6$ and $M_7$) are then estimated, from the measurements of the time of the arrival of the uplink signals sent by the neighbour donors to the distant base station (A). Because the reference modems are nearby, there are plentiful, good signals available from all around to allow ranging measurements and trilateration positioning. This is despite the users being indoors, and even if there is limited coverage by the base stations—even in the extreme case where there is only one network operator and only one base station visible.

Furthermore, the placing of the reference modems at the top and bottom of the building allow vertical positioning, to establish which floor the mobile assets are on. This can be difficult with conventional cellular positioning techniques using base station measurements, as base stations are often distributed roughly at the same roof-top altitude, making vertical measurements subject to large geometrical errors, or impossible.

Figure 8:
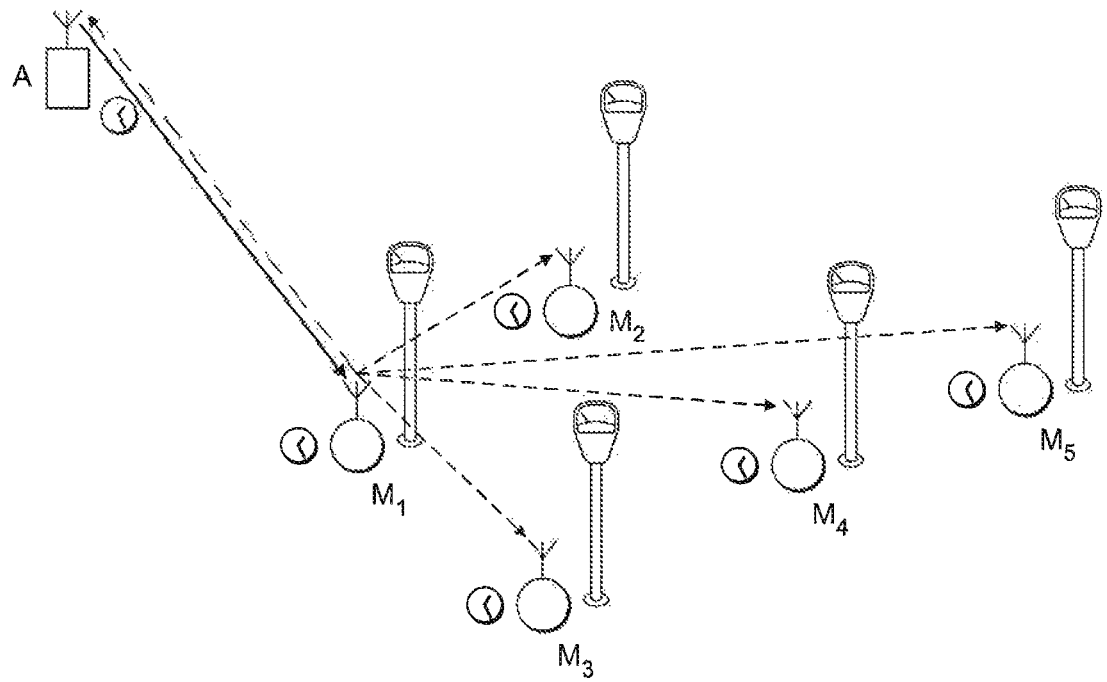
FIG. 8 illustrates the positioning of parking meters.

FIG. 8 illustrates the positioning of parking meters. In this example, we have a large number of battery operated devices, whose positions relative to one another need to be determined, so that the system knows which meter is which. They may be rather close together, which makes accuracy difficult when relying on measurements to distant base stations—a situation complicated by the effects of multipath between the base station and the cluster of meters. Also, in this example, energy consumption and efficiency are important, so as not to degrade the battery lifetime of the meters. The uplink transmission from the neighbour parking meter provides a useful local signal for positioning, with strong signals and good geometrical distributions.

As the illustration shows, the uplink signal can also be overheard by the multiple devices in the cluster of meters, so a single transmission can be used for multiple measurements. This gives excellent radio network efficiency, because it does not use much network capacity. It also gives good power efficiency, because only one message needs to be transmitted by the device, and not multiple ranging messages, one to each receiver.

For example, a complete system for establishing position (and time) at all of $N_M$ meters could involve the transmission by each meter modem of an uplink signal to the base station, each uplink signal being measured by all ($N_M$–1) other meter modems. This gives a total of ($N_M^2 - N_M$) measurements from just $N_M$ uplink ranging messages.

Figure 9:
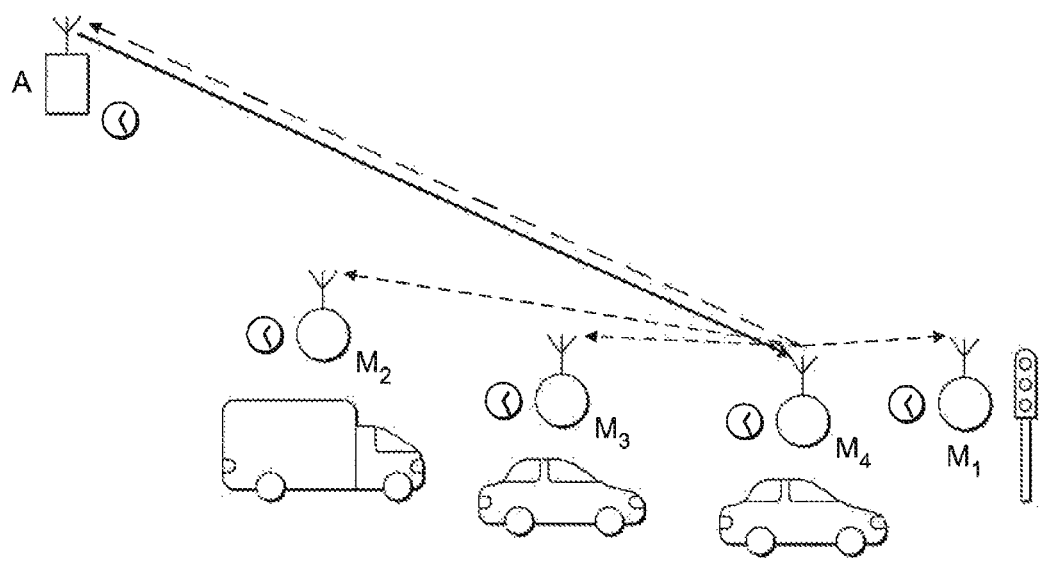
FIG. 9 illustrates vehicle-to-vehicle positioning.

FIG. 9 illustrates vehicle to vehicle positioning. In this example, we also have a large numbers of uses—in this case vehicles, which are moving around but which need to know their separation from each other in order to avoid collision. Because the vehicles may be moving rapidly, it is important that positioning measurements can be performed quickly. In particular, it is difficult to set up direct links between each pair of devices for performing a direct device-to-device ranging measurement for each. The high density of vehicles in an urban area, particularly when there is congestion, also leads to high demand on the spectrum capacity, so network efficiency is important.

As in the parking meter example of FIG. 8, the measurement of the uplink signals of neighbours provides local ranging measurements that can be used for positioning. The separation between modems (and therefore vehicles) can be established by comparing the measurements of the uplink signals made by pairs of devices. This has the benefit that it cancels the effects of clock offsets.

There may also be some fixed roadside features, relative to which the vehicle should establish its position. In this example, we illustrate the roadside feature (a traffic light) $M_1$ also making the measurement of the uplink signal from the vehicle, which can be used as part of the positioning system to find the position of the vehicle relative to the traffic light.

Because of the desire for positioning calculations to be performed quickly, independently of network/spectrum capacity, it may be desirable, in the vehicle to vehicle positioning scenario for the positioning calculations to be performed by one or more of the modems, rather than relying on a remote server. This is a similarly desirable in navigation devices, where the device has to perform position updates quickly, with low latency, so that communication with an infrastructure may be a problem. Another example where this is desirable is in the context of hybrid positioning devices, where sensors such as GNSS, cellular and/or inertial sensors are combined, where a tight integration of the signals is desirable.

Figure 10:
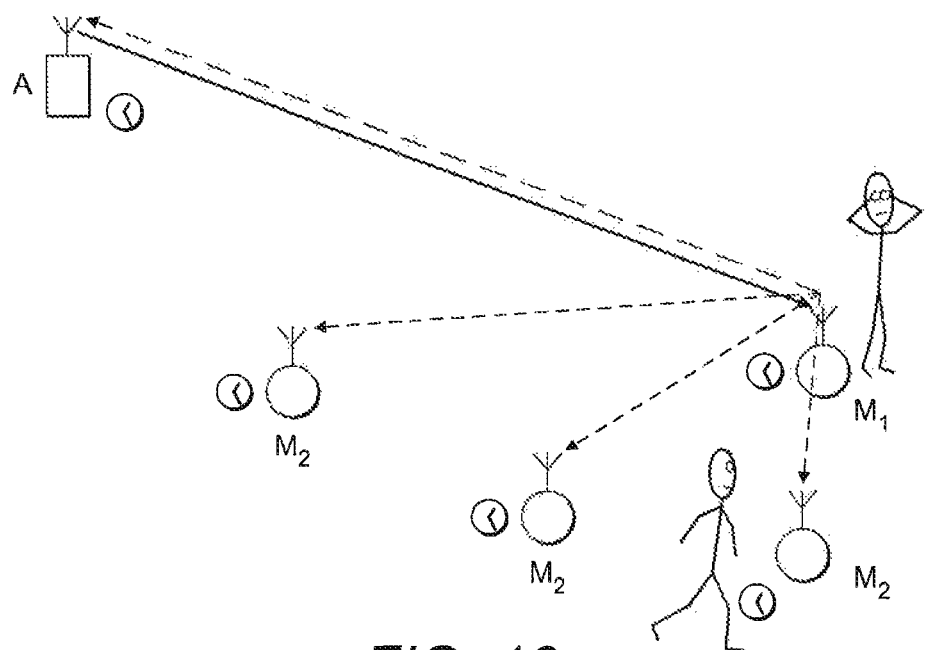
FIG. 10 illustrates a search and find application.

FIG. 10 illustrates a search and find application. In this example application, a single listener $M_2$ makes a number of measurements of the uplink signal from a neighbour $M_1$, each measurement being made in a different location. The measurements are then combined to estimate the position of the neighbour.

The uplink monitor measurements may be made by a First Responder to improve the positioning performance of an uplink measurement system for emergency calls. The estimation of position is easiest if the successive locations of the device listening to the uplink are known or can be related to other known locations, and if they have a good geometrical spread to the neighbour.

A particularly interesting feature of this use case is that the device in the unknown location, which in this case is the donor, can remain in continuous connection with the cellular network base station throughout the process—which can be very helpful, for example in emergency call applications.

This example illustrates that uplink measurements of different uplink signals from the same UE can be made at different times, and either by one device or multiple devices. It also illustrates that it may be the donor device (as in the example of FIG. 10), and/or the listening device (as in the example of FIG. 7), which is located by means of the measurements of the uplink signal.

Cellular System

Figure 11:
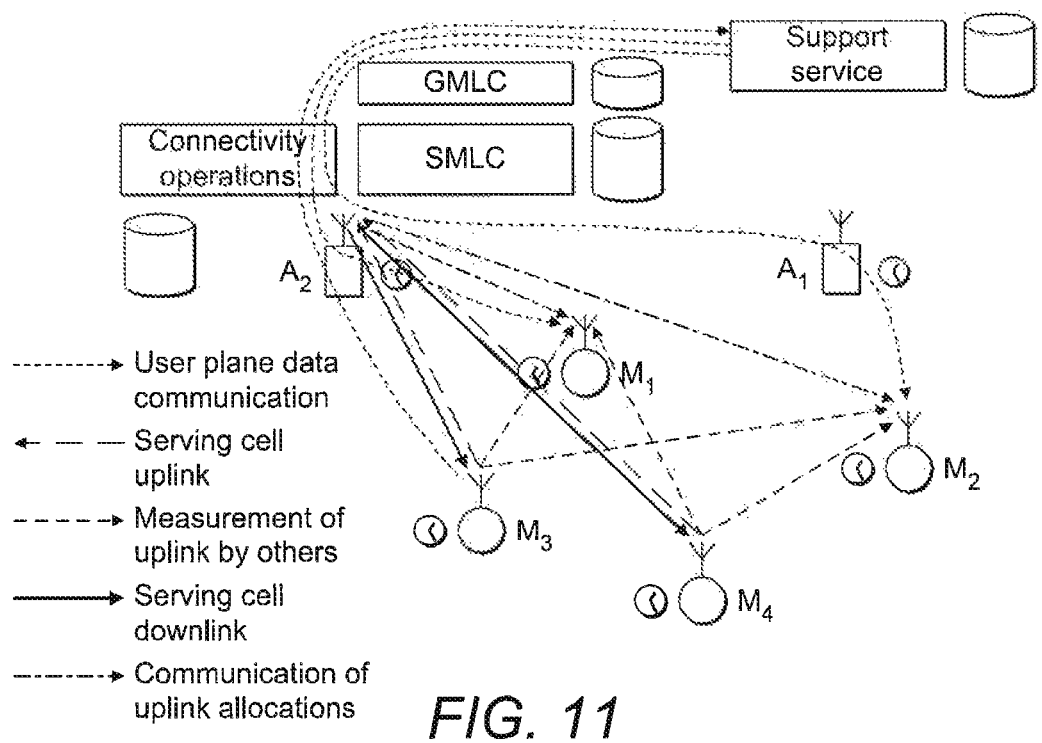
FIG. 11 is a sketch of a cellular network performing neighbour uplink measurement positioning.

FIG. 11 is a sketch of a cellular network performing neighbour uplink measurement positioning.

The normal communications functionality of the network is delivered by the infrastructure of base stations and connectivity operations software and databases, together with the mobile devices, with downlink and uplink communications between the modems and their serving cell base station. There may be positioning functionality provided by the network operator, with access via a Gateway Mobile Location Centre (GMLC) to provide location services (LCS) to the application. Location may be estimated by a Serving Mobile Location Centre (SMLC) that calculates the position of the device using the cellular signals, using the measurements of the time of arrival of the uplink signal at base stations. Third parties may also provide positioning systems, on top of the cellular infrastructure, using observations and measurements made by devices, and communication over the user plane.

For neighbour uplink positioning, modems listen to and measure the time of arrival (and/or other characteristics) of the uplink signal transmitted by neighbour donor modems to their base stations. There is considerable flexibility in the system design, as described below.

Donor and Listener Roles

A modem may act as a donor or as a listener, or indeed undertake both roles. The configuration will depend on:
  power consumption (comparing the energy for the donor transmissions, with the task of listening);
  the sets of measurements desired (if lots of measurements are required relative to a fixed reference point);
  transmissions as part of the neighbour uplink measurement process (requests and data traffic from modems can in themselves be used to provide donor uplink signals for measurement); and
  other activities (if a modem is active or connected then it may anyway act as a donor, providing signals that can be measured by listeners).

The swapping of roles between listener and donor, can be particularly useful in order to carry out a pair of listener-donor uplink measurements, as described elsewhere in this document.

Multiple Cells

The donor and listener do not have to be in the same cell—that is, the listener may monitor and measure the signal which the donor is sending to a base station which is not the base station of the listener. In fact, the listener does not even have to be on the same network, or radio technology, although of course it does need the capability to receive signals from the donor modem, and the other requirements of uplink measurement system operation. In the example of FIG. 11:

Information to and from the listener modem flow via its own base station;

It may be desirable for the listener modem to synchronise to, monitor and demodulate the control channels of the downlink of the donor's base station; and Monitoring and measurement of the donor modem and base station must be carried out without excessive disruption of the normal operation and connectivity of the listening modem with its own base station.

Service Functionality

Some functionality is necessary for supporting and using the measurement of the neighbour uplink for positioning. Uplink Measurement Management is concerned with arrangements for making the measurements. This will be described later, below.

The measurements are gathered and processed by a Positioning Engine (for example, at remote server 180) which estimates the position, using the measurements made. The functionality may be implemented:

In a distinct support service, communicating with the devices involved by means of user plane data connections established using the connectivity network(s);

As support services embedded within the network, for example as part of the SMLC; or Within the listening and/or donor modems, for example with local cache information or a live position-calculation capability.

The appropriate choice will depend on the overall system functionality, latency, power consumption, traffic cost, and business model. A good system design may involve a mix of functionality, distributed across services and modems.

Use of GNSS

Modems, whether listeners or donors, may in addition have positioning information, which is of assistance to the positioning engine. The position may be obtained from a Global Navigation Satellite System (GNSS), or from the manual entry of information by a user. If the modem is fitted with GNSS, it may have knowledge of accurate time and so be able to time-stamp transmission or reception of signals.

Measureable Uplink Signals

In principle, any uplink signal and message transmitted by the donor (first UE 112) to the base station may be overheard by a listening modem (second UE 110). A number of uplink messages and signals are of particular interest:

An uplink protocol message originating from the UE, such as a random access channel request by the UE for registering to the network, requesting resources, or for synchronisation (notably in LTE, the RACH). This is typically initiated by the donor modem.

An uplink protocol message, arising following action by the cellular network such as the uplink acknowledgement by the modem of receipt of a downlink (control or data) message. This is a consequence of the network and base station activity.

Uplink signals associated with the operation of the connectivity system, for protocol purposes or particularly for synchronisation, or for channel sounding measurement purposes, used by the base station for assessing the path from the modem to the base station (notably in LTE, the Sounding Reference signal, SRS). This is typically the widest bandwidth signal available. It is scheduled and determined by the network and base station.

Uplink traffic associated with data communication, such as the data, preambles, associated frame messages, and pilot and reference signals (notably in LTE, the DeModulation Reference Signal, DM-RS, used for the uplink channel estimation). This is configured by the network and base station, as part of its setting up of the uplink communication channel for use by the device. The signal is fairly wideband—the same bandwidth as the uplink data signal allocation being used by the modem—giving the possibility of good accuracy.

As noted, these signals may arise:

during normal operation of the donor modem, and the applications running on the donor device, and the services with which it is interacting;

as a result of a request from some uplink positioning function on the donor device, stimulating activity;

as a result of activity from a neighbour uplink measurement management function in the infrastructure, which triggers protocol activity and exchanges with the donor modem, and consequently uplink transmissions by the donors which can be intercepted and measured by other modems;

as a result of the neighbour uplink measurement management function in the service or on devices wishing to perform positioning, stimulating communication with the donor device and consequently generating uplink activity; or arranging that activity and an uplink message is scheduled by the donor modem to take place at a future time.

As an example, the transmission of data by a uplink management service to a donor modem would cause the connection with the base station to be built up, and data to be sent to the donor modem, resulting in a sequence of protocol messages and acknowledgements, and uplink transmissions. These are then available for measurement by listening modems.

Neighbour Uplink Measurement Sequences

Since the donor and listener are not in direct contact—that is, since there is no wireless link between them—some coordination of the donor and the listener is involved in the listener making the measurement of donor's uplink signals. Embodiments can use and build on the facilities provided by the cellular communication network, as illustrated in the following two examples.

Example 1: Donor Schedules an Uplink Access Request

Figure 12:
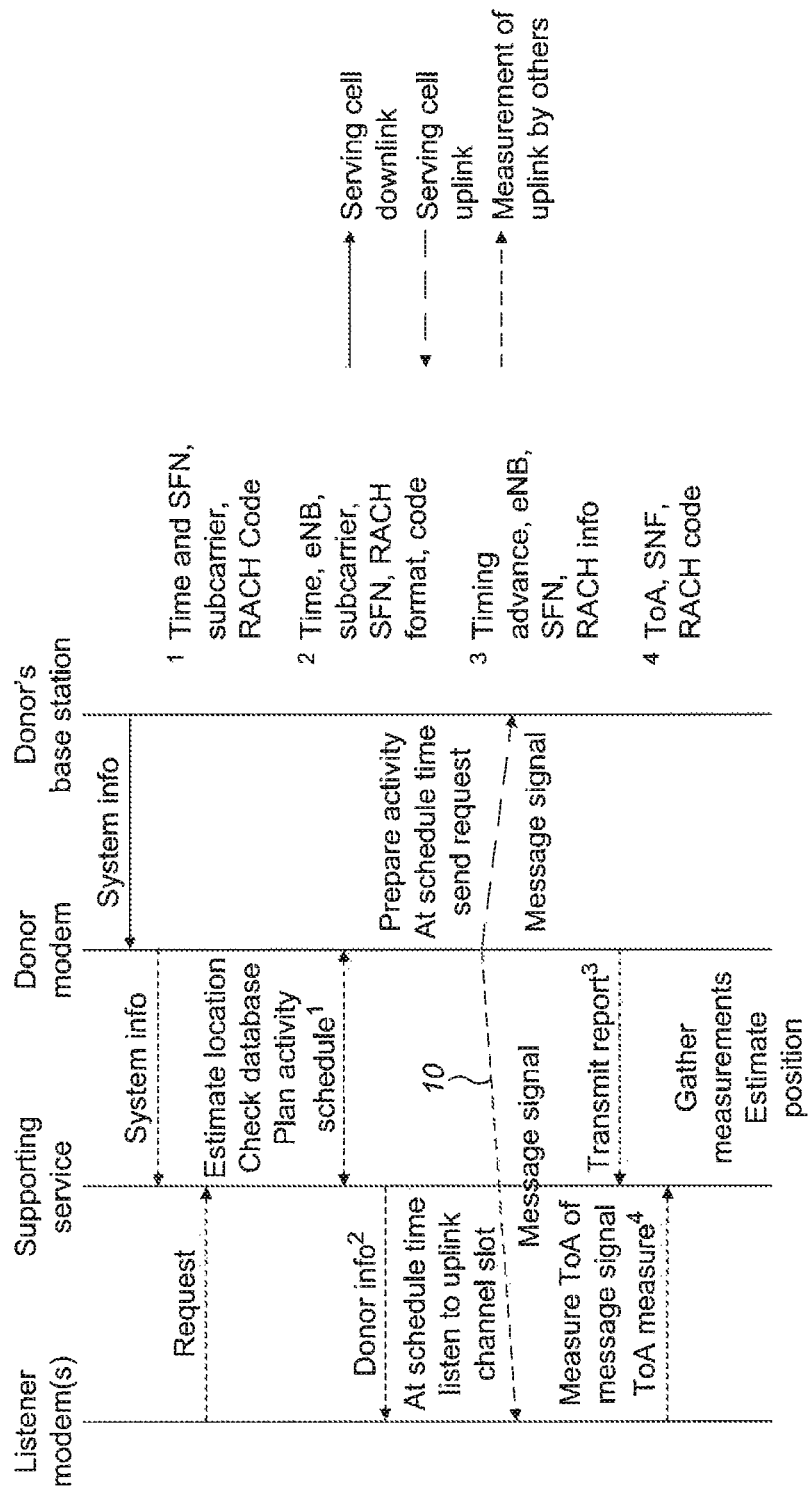
FIG. 12 is a sequence chart for scheduled measurement of a neighbour donor's access request.

FIG. 12 shows a sequence of operations for scheduled measurement of a neighbour donor's access request. In this example, it is assumed that there is a supporting service 190 and a pool of participating neighbours. It might perhaps be the building application use-case, described above with reference to FIG. 7.

The listener (UE 110) is in communication with the supporting service 190, via the cellular network and its base station 170 (which might not necessarily be the same base station as the BS 172 serving the donor modem), or by some other means. The listener requests a position, and the supporting service then arranges that the neighbouring donor modems will make transmissions at a schedule of times in the future. A number of donor transmissions may be scheduled, to serve the needs and requests of a number of listeners.

The uplink signal in this case is an access request (RACH). It is arranged with the donor that this will take place with a certain signature, and at a certain System Frame Number time. This arrangement reduces the likelihood of the listener measuring by mistake any other modem that happens to make an access request to the base station, and it also reduces the power consumption of the listening receiver, because the receiver can be enabled at the expected time of transmission of the access request.

The donor (UE 112) may need to suspend other ongoing activities and applications, and enter a network status (for example, idle mode) that will allow it to transmit the access request at the agreed time. The listener (UE 110) is informed of the scheduled transmission time, the subcarrier that will be used, and the RACH signal format (determined by the network) and signature (determined by the modem, but possibly influenced by the supporting service) which the donor will be using. This interception-assistance information helps the listener to identify the correct uplink signal. The listener modem then configures itself to perform the listening operation, disconnecting from its connection and changing frequency as necessary, and waits until the scheduled System Frame Number SFN time, when it measures the time of arrival (and/or other characteristics) of the donor's uplink message to the base station. It then reports the measurement(s) to the positioning engine (remote server 180), together with the signature measured. Note that, in this embodiment, it is assumed that the remote server 180 and the supporting service 190 are the same.

The donor modem may also confirm to the supporting service the sending of the message, the signature used (for checking consistency), and other useful timing information such as the current Timing Advance of the donor relative to its base station. From the set of such measurements of multiple neighbour donors, the positioning engine is then able to estimate the position of the listener (UE 110). It may be that occasionally the uplink signal of another transmitting modem is measured by mistake, but this can be discarded by the positioning engine as being inconsistent with the result of a position fix using the other measurements.

Example 2: Donor Uplink Data Reference Signal Measured

Figure 13:
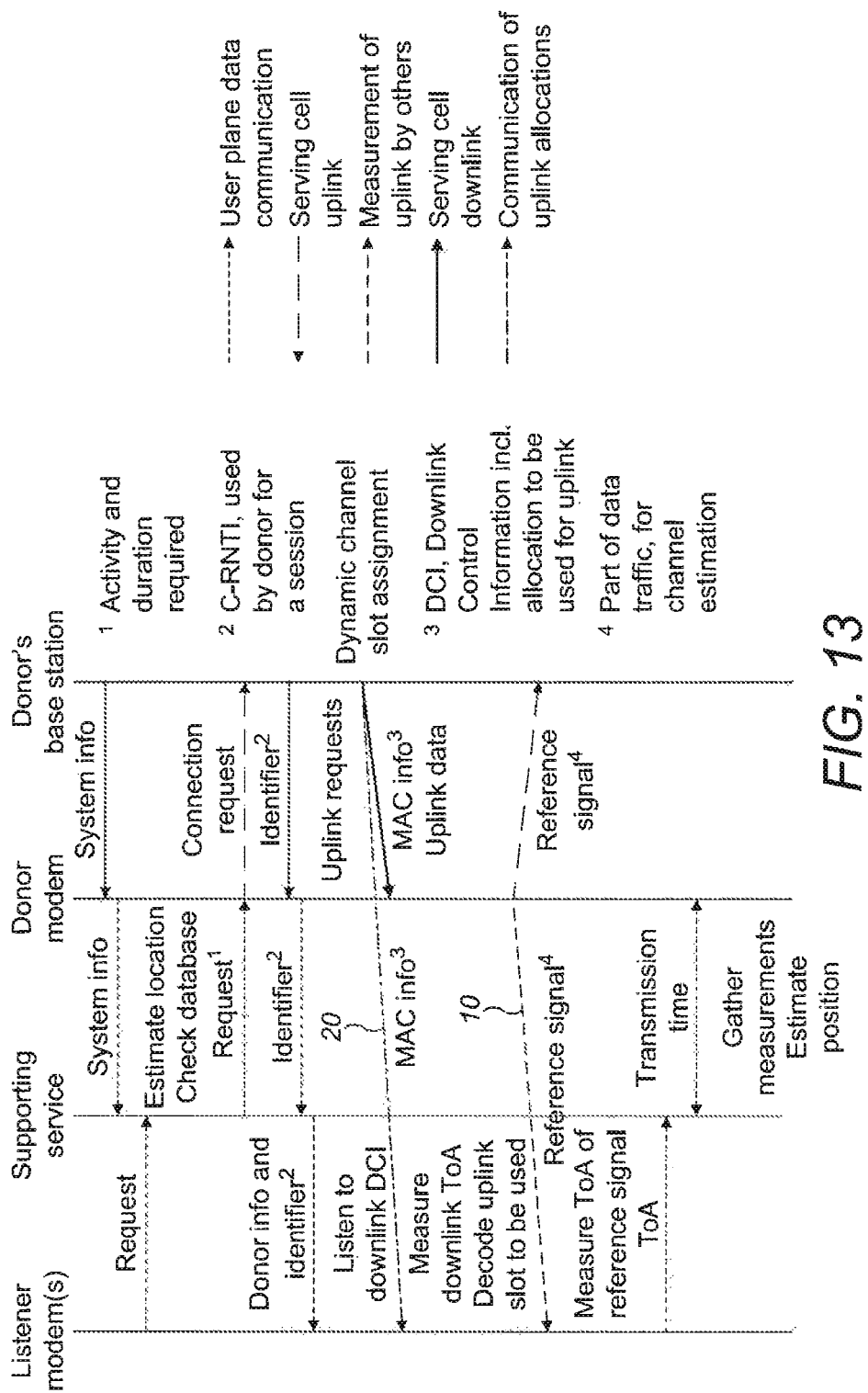
FIG. 13 shows a sequence of operations for a measurement using the uplink demodulation reference signal.

FIG. 13 shows a sequence of operations for a measurement using the uplink demodulation reference signal. In this example, we use a signal which has better properties for making accurate measurements, the demodulation reference signal (DMRS). This is part of the uplink data signal message, and so is visible when the neighbouring donor modem is in connected mode, transmitting uplink data. The channel allocations for the uplink are determined by the network, and are reported to all users in the Downlink Control Information block. Each connected modem extracts its uplink allocation from this information, with the individual allocations identifiable according to the Cell Radio Network Temporary Identifier (C-RNTI) provided to the modem when it connects to the network for a session.

In this case, following a request for a position, the supporting service 190 connects to the neighbouring donor (UE 112), establishing a connection by the donor to the network, and instructing the donor to remain connected for a period (in order to maintain the validity of the temporary identifier), and to arrange appropriate uplink data traffic, and hence associated reference signals.

The listener device (UE 110) is informed of the temporary identifier and the donor information by the supporting service 190. The listener will then accordingly configure itself to listen to the downlink 20 of the base station 172 serving the donor modem (UE 112). Note that, in general, this may be on a different frequency (or even a different network) to the listener's normal connection, so it may involve temporary disconnection from the normal network of the listener, and synchronisation instead to the donor's base station 172.

From the DCI block, the listener (UE 110) overhears the control information being sent to the donor and identifies the uplink resource allocation which the donor will use for the reference signal. (The control information is sent a few frames before it is required to be used.) Additionally, as the listener is receiving the downlink 20 from the donor's base station 172, it can also measure the time of arrival (and/or other characteristics) of the downlink signal 20, and can report these measurements also to the positioning engine (remote server 180). This is helpful additional information for the positioning engine.

With this uplink resource allocation information, the listener is then able to receive and measure the time of arrival of the reference signal in the uplink data message transmitted by the donor. (Note that the uplink frequency of the donor might be a different frequency to the normal uplink of the listener, if the donor is operating on a different cell or network.)

The listener then reconnects to its base station 170 if necessary, and reports to the remote server 180/supporting service 190 its measurements of the neighbour donor uplink signal, together with the characteristics measured for the donor base station downlink. The service meanwhile also gathers other measurements and other location information, and calculates the position.

Neighbour Uplink Measurement Management

To facilitate the measurement of the uplink signals of neighbours, some form of information gathering and exchange is desired, as described below. This may be implemented by direct communication between the active devices in the system (reference devices or targets), or facilitated by a support service, preferably with a database.

The uplink measurement management function is concerned with arrangements for making the measurements. It preferably:
  collects information about devices and particularly reference devices, and their location and activity;
  gathers information about base station frame timing and cell uplink allocations;
  selects an appropriate set of modems to participate in a positioning task (taking into account proximity, geometry, power consumption, measurement quality, traffic cost etc.);
  provides information about neighbour activity and/or requests to modems wishing to make and/or support measurement requests; and schedules donor activity and listener measurements Examples of the operation of a measurement management service will be described later below.

Neighbour Selection

Uplink signals from any or all neighbouring devices, and measurements by all capable modems, may be used for positioning purposes. However, this will normally not be a particularly efficient use of resources, spectrum capacity or energy. For a particular positioning task (that is, the desire to provide a position estimate for one or more devices) a subset of the possible devices may be selected by the neighbour uplink measurement management. Selection of a suitable set of neighbour devices may be on the basis of criteria such as:

- Neighbours being a member of the community of devices prepared to assist in positioning of other devices (subscribing to the same network or positioning service provider, or being supplied by same positioning system/device manufacturer);
- Neighbouring donor modems that are able to provide identity information, or have already or recently done so;
- A set of donors on a reduced set of channels, to simplify the measurement task of the receiver (for example, able to receive multiple signals on the same frequency channel);
- Neighbours having plentiful resources (such as a power supply) or donors engaging in plentiful uplink transmission;
- Donors with favourable uplink signal characteristics, such as a wide bandwidth signal channel allocation;
- Donors likely to produce an uplink signal with good signal to noise ratio at the likely location of the receiving listener modem (in other words, donors that are expected to be in the same vicinity); or
- A set of neighbours likely to produce a helpful geographical and geometrical distribution to support positioning by trilateration, well distributed horizontally, ideally around the boundary of the likely location of the listening device, and also vertically (particularly for the in-building use case).

As mentioned previously above, a neighbour uplink measurement management service may contain and provide this information to a listening device, or it may provide information such as the signal properties of the donors, their schedules, and their locations. Alternatively, this management functionality may be distributed—for example, with the donor devices providing the necessary information; a service or communications facility transporting and/or storing the information; and the listening devices using and acting upon the information, to make an appropriate selection of uplink signals to measure.

Local Uplink System Operation

In order that a listener may overhear the transmissions of a donor it should have knowledge of the operation of the uplink being used by the donor. This is particularly relevant as the donor may be operating connected to a different base station, on a different channel, indeed on a different radio network to that of the listening terminal.

Information about the uplink signal to be intercepted and measured includes:

- The channel (for example, frequency) and other parameters (such as bandwidth, number of OFDM channels);
- The frame timing structure and sub-channel allocations (such as the timeslots allocated for random access by devices); and/or
- The actual timing of the frame (compared to some reference, such as UTC, or some other reference, such as the timing of a second base station)

This information may be gathered from:

- A listener terminal monitoring, measuring, and interacting with the base station serving the donor modem, enabling the listener to:
  - synchronise to the cellular base station frame timing;
  - establish the frame count and clock for the donor;
  - identify the slots within the frame structure that are used for the different purposes; and
  - extract information from downlink control messages, relating to the donor modem and its uplink allocation,
- Information provided by the donor device, as a result of its interaction with the network, and/or
- Information provided by the network operator.

Signal Coordination

In order for the uplink signal from a donor to be measured, the listener terminal (UE 110) must be listening when the donor is transmitting. This might not be straightforward, particularly if power consumption, battery life and latency are important. It would be possible for the listener to be continuously monitoring the radio channels, opportunistically waiting for the transmission by a donor. This may be appropriate for mains-powered devices, or devices only requiring a very occasional position fix, when the energy consumption involved can be tolerated. Indeed, measurements may be made opportunistically, while the listener is engaged in other activities. However, this is an inefficient approach.

More effective is some form of neighbour uplink management service to facilitate the measurement of a neighbour signal by the sharing of information, Possible approaches include:

- Engagement with the system, to monitor the uplink radio channel at times particularly likely to be used by donor devices (for example, in time slots when UEs transmit to gain access to the wireless channel, or when they are likely to respond to acknowledge messages for their continued membership of the network);
- Stimulation of the neighbouring device to cause it to transmit a message that can then be measured (by request from the listener device, or via interaction with a coordinating service); or
- Management of the system by an application service of which the modems and neighbours are members, which triggers appropriate interactions with the devices on the network according to a schedule that allows the uplink transmission to be measured by devices in the vicinity.

Examples of sequences of operations that result from the operation of an uplink management function have been described already above.

Uplink Signal Management

The signal used by the donor may be actively managed by and with the neighbour uplink management system. This may include the advance sharing or instruction of parameters for a random access request, in order to facilitate its efficient and effective use by other devices for reception and time of arrival measurement, including:

- the code to be used by the donor (chosen to minimise confusion with the signals from other donors); and/or
- the accurate time of its transmission (System Frame Number, SFN) and frame timing offset.

Other parameters may also be shared or instructed in advance, relating to the activity of the device once it has established a connection, including:

the duration of a connection (in order to keep an allocated temporary identity current); and/or the data to be sent (to determine the channel occupancy, bandwidth and duration, for measurement).

If the donor device (UE 112) is connecting to the listener (UE 110) via the base station, or is connecting to the service, then this further sharing or instruction may take place dynamically, during operation, as is the case in Example 2, above.

Identity Information Exchange

As has been remarked, identity information is required, so as to separate uplink signals, and/or to associate them with particular devices. This device-specific identify information may include:

device logical identity information, such as the Cell Radio Network Temporary Identifier (C-RNTI) provided by the network to the terminal in LTE;

MAC information, such as:
 a time slot to be used for a Random Access Channel (RACH) transmission,
 the time and frequency resource block(s) to be used for an uplink data transmission;

coding information, such as:
 the code used by the donor modem for its transmission; and/or data information, such as:
 indication of a particular data sequence or details of the signal transmitted, to facilitate its identification and use.

If for some reason a connection by the donor is broken, and has to be re-established, then the network operator might allocate it a fresh temporary identifier (C-RNTI), in which case this updated information should preferably be shared with the listening device(s).

The gathering and sharing of this identity information may arise in a similar way to the local uplink system operation, described above. This may include one or more of:

Monitoring, decoding and measurement by a listener modem of the downlink signal from the base station serving the donor modem. This is desirable because the downlink DCI message from the base station instructs the donor modem which MAC resource block to use for its forthcoming uplink data communications. The listener modem can also receive this, and if it knows the C-RNTI identity (see below) for the donor modem, can decode the instruction and establish the uplink MAC resource block that will be used by the donor.

Information provided by the donor modem, as a result of its interaction with the network. Examples include:
 The reporting by the donor modem of the C-RNTI that has been allocated to it, so that the listening device can interpret the DCI messages from the base station and determine the resource block allocated to the modem;
 The choice by the donor modem of the signature it chooses to use for the RACH request; and/or
 Its planned time of transmission of the signal, generally or in terms of the local frame time.

Position Estimation with Neighbour Signals

A Positioning Engine (remote server 180 or, in some embodiments, one of the UEs 110, 112) gathers the measurements and information available, and produces an estimate of the result. It preferably:

collects measurements;
gathers and stores information about base station and modem location and precise timekeeping; and
produces position and/or time estimates and information, optionally with uncertainty information.

In a typical "Internet of Things" deployment there will be multiple sensor devices, all of which are able to make and share measurements. These may include measurements of the neighbour uplink, optionally together with measurements of the downlink from the base station. This can give considerable richness of data, which can be exploited by a positioning system. This data can optionally also be combined with measurements of the uplink signals by the base stations.

Neighbour Modems' Uplink Signals

Figure 15:
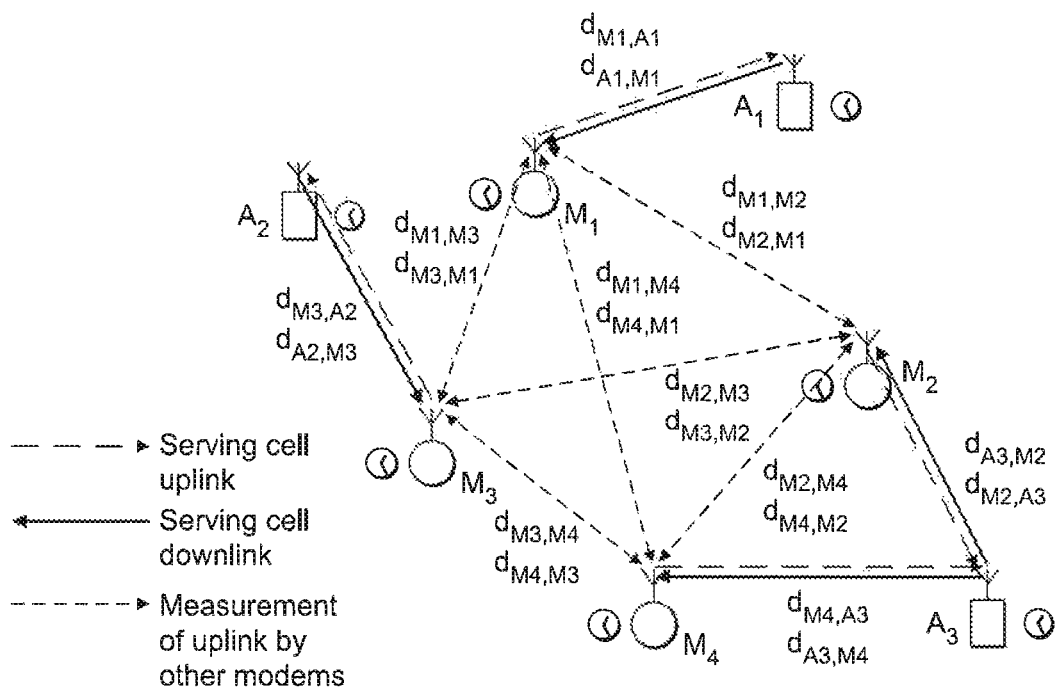
FIG. 15 illustrates an example of measurement of neighbours' uplink signals by modems in a cellular network.

For measurement by modems of the uplink signals sent to the base station by neighbours, FIG. 15 shows the uplink signals of the network connectivity, together with the possibility that these signals can be received and measured by other (listener) modems in the vicinity.

This shows the set of measurements in principle possible by monitoring the uplink signals from neighbouring mobile devices. It can be seen that the local distances between devices can be measured, which can be extremely useful for finding their relative position, particularly in comparison with the small differences between potentially long distance measurements that are a feature of the measurements involving the base stations.

Signals in both directions between any given pair of modems may be measured, giving pseudoranges not only for the uplink signal transmitted by $M_1$ as measured by a receiver at $M_2$, but also the uplink signal transmitted by $M_2$ as measured by a receiver at $M_1$. Such a system thus measures the pseudorange in each direction, $d_{M1,M2}$ and also $d_{M2,M1}$, which differ because of the different clock offsets of the transmitter in each case (which may be solved as part of the positioning solution). This possibility is discussed in further detail later below.

Modem Measurement of Downlink and Neighbours' Uplink Signals

Figure 16:
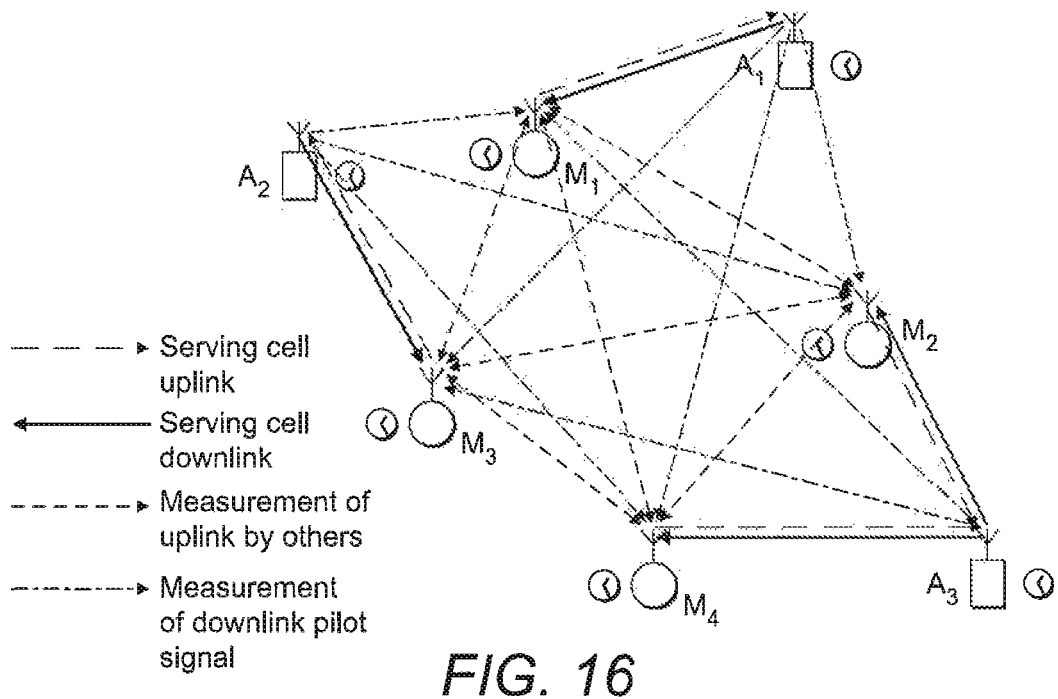
FIG. 16 illustrates a complete set of neighbour uplink measurements and downlink measurements able to be made by the modems in the network of FIG. 15.

Considering just the cellular system, but putting the neighbour uplink and downlink together, we then have all the measurements that can be made by modems able to measure their neighbours' uplink transmissions, as well as the downlink signals of the base stations. FIG. 16 illustrates this, for the case shown in FIG. 15.

Positioning Examples

A few examples will now be discussed, to illustrate the way measurements of neighbour uplink signals can be used to advantage in a manner analogous to known positioning techniques.

More complex solutions than these examples are also possible, potentially involving the explicit solution of the location of multiple devices and the transmission times and clock offsets of donors and listening devices. This will be outlined later below. The examples in this section serve to illustrate how positioning can be extracted for the case when the clock of the donor device is unknown and not of interest, and illustrate some of the usage applications and the desirability of the some of the measurements.

Each modem and base station will have its own local clock, and there is no global knowledge of time. As general terminology, let us consider that a signal s is transmitted from device i at time $t_{s,i}$ measured by its local clock with an offset of $\alpha_i$ as $T_{s,i} = t_{s,i} + \alpha_i$, and that this signal is received by device j at time $r_{s,j}$ measured by its local clock with an offset of $\alpha_j$ as $R_{s,j} = r_{s,j} + \alpha_j$, and with a propagation delay between the devices of $\tau_{i,j}$, then we have $$r_{s,j} = t_{s,i} + \tau_{i,j}$$

and as observed in terms of the local devices' clocks $$R_{s,j} = T_{s,i} - \alpha_i + \alpha_j + \tau_{i,j}$$

We will now consider a few useful special cases.
Time Difference of Arrival

If the signal from a donor modem is overheard by two listener modems, then each of the listener receivers can measure the time of arrival of the same transmitted signal. The time difference of arrival can then be computed, so that the transmission time of the signal no longer has an effect, as follows.

If we have a message received by a pair of modems, j and k, then:

$$R_{1,j} = T_{1,i} - \alpha_i + \alpha_j + \tau_{i,j}$$

$$R_{1,k} = T_{1,i} - \alpha_i + \alpha_j + \tau_{i,k}$$

So we have the time of arrival difference:

$$R_{1,j} - R_{1,k} = \alpha_j - \alpha_k + \tau_{i,j} - \tau_{i,k}$$

$$(\tau_{i,j} - \tau_{i,k}) = R_{1,j} - R_{1,k} - (\alpha_j - \alpha_k)$$

The time difference of arrival at the two modems thus gives information about the difference in the distances to the two modems, $c \cdot (\tau_{i,j} - \tau_{i,k})$, and a correction depending on the relative time offset between the listening modems, j and k, and can as solved to give a locus of potential position locations and relative time offset using known hyperbola-based positioning techniques.

This technique does not need any active cooperation or involvement of the donor device in the positioning calculation. It relies instead on the listening devices noting identity information for the signal, at least at the MAC level, and associating together the signals received at the listening devices, as coming from the same donor device, and being the same transmitted signal.

The usefulness of this technique is that no information need be known about the transmission time at the donor device, and that uncertainties or tolerances in the signal time of transmission also have no effect. It can form the basis of more complex positioning systems, by forming multiple Time Difference of Arrival measurements from pairs of listening devices.

Two-Way Measurement

If we carry out a pair of measurements and we know the difference in the transmit and receive times within each device, then the clock offsets of the devices can be cancelled out, as follows.

If we have two messages, between the pair of devices, then $$R_{1,j} = T_{1,i} - \alpha_i + \alpha_j + \tau_{i,j}$$

$$R_{2,i} = T_{2,j} - \alpha_j + \alpha_i + \tau_{i,j}$$

and since the propagation delay is the same in each direction we can sum the two to give $$R_{2,i} + R_{1,j} = T_{1,i} + T_{2,j} + \tau_{i,j} + \tau_{j,i}$$

$$\tau_{i,j} = \frac{(R_{1,j} - T_{1,i}) + (R_{2,i} - T_{2,j})}{2}$$

$$\tau_{i,j} = \frac{(R_{2,i} - T_{1,i}) + (R_{1,j} - T_{2,j})}{2}$$

So, the propagation delay can be found from just the transmit and receive times of the two signals in the local clock domains. Note that device i=1 transmits signal s=1 and device j=2 transmits signal s=2. Hence:

$$\tau_{1,2} = \frac{(R_{2,1} - T_{1,1}) + (R_{1,2} - T_{2,2})}{2}$$

This technique involves the active cooperation of the second device, as the second device transmits the second signal at a (local) time offset which is known, compared to the time of arrival of the first signal. An advantage of this is that no information need be known about the absolute transmission time of the devices, and it simply and directly gives information about the relative separation between the devices.

Neighbour Uplink and Base Station Downlink Time Difference

The combination of an uplink measurement together with the measurement of the time of arrival (and/or another characteristic) of the downlink signal from the donor's base station is convenient, particularly as the downlink signal from the base station may anyway be received and monitored either if it is the base station of the listening receiver, or to extract information about the scheduling for the donor modem.

The uplink signal transmitted from device i and received by listening device j is $$R_{U,j} = T_{U,i} - \alpha_i + \alpha_j + \tau_{i,j}$$

and similarly the downlink signal transmitted by the base station, device 0 and received by listening device j is $$R_{D,j} = T_{D,0} - \alpha_0 + \alpha_j + \tau_{0,j}$$

where $\tau_{0,j}$ is the propagation delay from the base station to the listening device, and $\alpha_0$ is the local clock offset of the base station.

Forming the difference of the measurements of the time of arrival of the neighbour uplink and the downlink signals we have $$R_{U,j} - R_{D,j} = T_{U,i} - T_{D,0} - (\alpha_i - \alpha_0) + \tau_{i,j} - \tau_{0,j}$$

giving $$(\tau_{i,j} - \tau_{0,j}) = (R_{U,j} - R_{D,j}) - (T_{U,i} - T_{D,0}) + (\alpha_i - \alpha_0)$$

This expresses the difference in the propagation distances from the donor modem and from the base station, as a function of the difference in the time of arrival of the two signals at the listener, and the difference in the time of transmission of the uplink and the downlink signals at the donor modem and the base station, together with the corresponding local clock offsets. Note that as it is a difference measurement, the local clock offset of the receiving device has been cancelled out of the expression and has no effect.

In a cooperating system, information may be available about the transmission times of the donor modem and the base station. Meanwhile, in many cellular systems there is further information available as a result of the system design of the cellular network. In particular, the system may be designed so that the uplink signal is transmitted by the donor at a time such that it arrives at its serving base station at a known time, synchronised with the base station. This gives the additional relationship:

$$R_{U,0} = T_{U,i} - \alpha_i + \alpha_0 + \tau_{i,0}$$

which, by rearranging to $$T_{U,i} = R_{U,0} + \alpha_i - \alpha_0 - \tau_{i,0}$$

and then substituting into the above, gives $$(\tau_{i,j}-\tau_{0,j})=(R_{U,j}-R_{D,j})-(R_{U,0}-T_{D,0})+\tau_{i,0}$$

This useful relationship gives the difference in propagation delays from the donor modem and from the base station, as a function of the time difference of arrival of the signals from the donor and the base station, the time difference between the reception of the uplink signal at the base station and the transmission of the downlink signal by the base station, and the propagation delay between the donor and the base station. The clock offsets of the base station and of the donor have cancelled out, and have no effect.

As has been mentioned, the difference between the reception of the uplink signal at the base station and the transmission of the downlink signal by the base station may be known and well controlled as part of the operation of the cellular network, for example the timing may be set such as to arrive at a particular part of the base station frame structure, to within a certain tolerance, and the number of elapsed frame intervals between the reception and transmission events will normally be known. The propagation delay between the donor modem and the base station may be known (for example from knowledge of the base station location and the donor location), or it may be known by the cellular system and, to a certain accuracy, the donor modem as the Timing Advance by which the donor modem is instructed to adjust its timing in order to achieve synchronisation of the uplink signals on their arrival at the base station.

This relationship therefore gives the positioning engine a hyperbolic difference curve for the locus of possible listener locations, depending on the measured difference in the time of arrival between uplink and downlink signals, and the other information about frame timing and propagation time between the donor modem and its base station.

Using Neighbours with GNSS

A simple solution for positioning is applications in which donor devices are reference devices with GNSS, and are in communication with the positioning engine to provide their known positions as calculation-assistance information. (And these positions may also be useful as acquisition-assistance information, as discussed previously above.) In this case, the location and timing of transmission and reception events by the donor devices are known, and they are effectively known transmitters, allowing the location and time of a device without GNSS visibility to be estimated. For example, if all the devices are u-blox devices having GNSS and subscribing to a CellLocate service, then if:

device $M_1$ is indoors and unable to receive any GNSS signals; but devices $M_2$, $M_3$ and $M_4$ are outdoors and able to establish their position from GNSS, then the position of the target device $M_1$ could instead be estimated by measurement and triangulation or trilateration of the uplink signals from the donor modems $M_2$, $M_3$ and $M_4$. Furthermore, if the listener modem has GNSS then a combined position estimate may be performed using the cellular and GNSS signals. For example:

Some GNSS signals may be available to $M_1$, and a combined position fix may be performed using a combination of the GNSS signals and donor modems' uplink signals; or For a timing application, the reception of the uplink signals from a single donor device $M_2$ may be sufficient to provide a good time estimate, either for the application running on the device $M_1$, or to provide accurate timing assistance for the GNSS on $M_1$, so that it can itself acquire satellites successfully.

A similar use of this principle was illustrated in the search and find application, discussed previously above, with the measurements in this use case being undertaken by a single modem, the modem of the searcher, which is listening to and measuring the uplink signals from the target modem at different times, and with the searcher in different locations. As the searcher device knows its location, for example from measurements with GNSS augmented by an inertial navigation system, times of arrival are used together with the known locations and timekeeping of the searcher to estimate the position of the target.

Neighbour Uplink Calculation-Assistance Information

In addition to interception-assistance information which is provided by donor devices so that the receiver can acquire, identify, and measure their signals, this and other information can also be used as calculation-assistance information for positioning purposes in the Positioning Engine (remote server 180). The positioning engine gathers the uplink signal measurements of the neighbours, together with any other information, and performs the position and time estimation as discussed above. Particular calculation-assistance information relating to the uplink signal measurement(s) which is desirably provided to the position engine may include the following.

A first useful type of calculation-assistance information is identity information. This can be used for identifying which signal came from which device, so that signals received from the same donor can be matched up—in particular, to link measurements made by different receiving terminals. This information may be MAC information, and/or logical identity information for the donor modem. The identity information may further be used to identify the actual device that transmitted the uplink signal. This is clearly essential to associate the transmission with the physical device, and its location and other properties.

A second useful type of calculation-assistance information is timing information. As a further input to the positioning engine, the transmission time of the donor signal uplink may be made known. This is clearly helpful to establish the time of flight of a signal, and for comparing and using multiple transmissions by the donor at different times (as the offsets in their transmission times are known).

The timing information may be obtained by the positioning engine in a number of ways, including one or both of the following:

Reporting by the donor of the time of transmission of the uplink signal, after it has been transmitted. This might be appropriate for an uplink signal transmission as part of a data transfer, transmitted under the management of the cellular network, as it is only after spectrum resource block allocation and signal transmission that the precise time of transmission is known by the donor, and able to be shared.

Scheduling of the transmission to occur at a precise time, and making this information available. (Note that this information may be of much higher quality and accuracy than that of the scheduling and MAC resource block information, used for assisting signal measurement.) This might be appropriate in the case of a transmission initiated by the donor device, such as the RACK request for connection. In these cases, the timing of transmission may originally be determined by the donor device, or possibly influenced or determined by the donor uplink management service, as discussed previously above.

Any convenient time base may be used, such as:
- local clock time differences (for the time intervals between sets of transmissions)
- the received frame time of the cellular (downlink) signal;
- time interval relative to a received measured signal (for example, for two way measurement, discussed already above); or
- UTC time from GPS, if available.

Relative timing information known to the system or the donor is also of assistance to the positioning engine, particularly information relating to the time of arrival of the donor signals at their base station, and thereby to the propagation time between the neighbour device and its serving base station. This is part of the cellular system design, Timing Advance in GSM, and may be based on Round Trip Time measurements by the cellular system.

A third useful type of calculation-assistance information is position information. Position information that may be known about the location of the neighbours is of course very helpful for the positioning engine. This may be from a GNSS device (for example, a GPS receiver), other sensors, or other previously obtained or manually entered position information.

The distance of the donor from its base station may be of particular assistance to the positioning information if it is also using measurements of the downlink signal, as it assists the estimation of the relative timing between the donor and its base station.

A fourth useful type of calculation-assistance information is base station information. Position and timing information relating to the base station is helpful to the positioning engine, particularly to relate the signal timing to UTC, or if the downlink signal is used as well as the uplink signal (as described already above). This information may include one or both of: the position of the base station; and the UTC timing of the base station.

Functionality to Support Neighbour Uplink Measurement

Listener Role

In order for a mobile device to be able to measure and use the uplink signal transmitted by a neighbouring donor modem, the listening modem may require additional functionality.

A first aspect may be the ability to receive in the uplink band. Normally a UE will have the capability of receiving signals in the downlink band only. The extension to receiving the uplink signal may influence some or all of: the local oscillator frequency generation and supply to the receiver; the RF, filtering and/or duplexer arrangements, which may normally prevent signals in the normal transmit band from entering the receiver; and the filtering in the receive path, which now should also accommodate and suit uplink signals A second aspect may involve MAC processing and signal processing to distinguish and acquire the uplink signal(s). Individual uplink signals from different devices must be received and separated, in a manner corresponding to whatever technique is used for the uplink Medium Access Control, which may be a combination of time, frequency, and spreading code multiplexing, depending on the cellular system design. Normally, the receiver is designed to acquire the downlink signal—the uplink signal will often have a different air interface design in terms of signal bandwidth, modulation format, and synchronisation signals.

A third aspect concerns data demodulation to identify the uplink signal. It will typically be necessary to identify the uplink signal being measured, so as to use measurements of and by multiple devices. This may also be useful if there is communication with the donor modems for stimulating activity, or sharing measurement results or timing information. To some extent, the device may already be identifiable as a result of the MAC to separate the signal—for example, by the time slot, frequency, and spreading code used in its transmission. Further identification purposes may require the identification of a MAC property of the device (for example, the spreading code used by the transmission) or by demodulation of some part of the (uplink) signal to extract some form of logical device identity information. Conventionally, a mobile receiver does not need such functions, as the uplink of neighbours is not of interest. In addition, it might be desirable to decode a frame count signal, for additional longer term timing information, although this will often be available from the normal downlink measurements making its measurement from neighbours unnecessary.

A fourth aspect concerns signal processing to measure the time of arrival and/or other characteristics of the uplink signal. After acquisition, the timing of the signal from the donor modem is preferably measured by the listener terminal. This may be done, for example, by detecting and using frame and synchronisation signals, or any known data sequences or signal messages, including possibly protocol messages, transmitted by the donor as the uplink signal to be measured.

Additional functionality may also be required for neighbour base station downlink reception and measurement. As illustrated by the sequences of operations in Examples 1-3 above, it may be necessary to measure the downlink of the base station which is the serving cell for the donor, for the purposes of one or more of: establishing the frame timing of the donor; decoding uplink allocations to be used by the donor (for RACH channels, data traffic or soundings); and measuring the time of arrival of the signal from the base station. This may be required even if the donor is operating on a different cell to the listening modem, which may even be on a different network or radio technology.

Additional functionality may also be required in the software stack. The software stack may need to perform a number of additional functions within a listening device, including one or more of: instructing low level activities, including MAC decoding and the scheduling of reception and measurements at specific frame times; establishing the timing of physical layer measurements, and passing these to the positioning application; and maintaining a consistent timebase for the comparison of timing events.

The reception and measurement of many donor signals may have to be scheduled and carried out. This may have to run concurrent with normal modem activities. The software on the neighbour may also need, for the MAC signals being received, to: establish which MAC signal(s) being measured are from the same (known or unknown) donor; and determine identity information about the donor, which allows it to be associated with a known donor modem. This information may be obtained by interaction with the donor or supporting service.

Donor Role

A cooperating donor modem may provide additional functionality by being able to cooperate, for example by:
- undertaking uplink transmission activities for measurement by others;
- sharing network configuration information with others as interception-assistance information;

scheduling uplink transmissions, possibly together with a supporting service and/or listeners and other neighbours;

arranging suitable signatures (for example of the RACH message preamble), so as to avoid ambiguity; and/or sharing signature and identity information (including C-RNTI) with participating listeners as interception-assistance information.

A donor may also undertake and provide measurements of the downlink signal from its own base station.

Network Functionality for Neighbour Uplink Measurement

The wireless infrastructure network undertakes activities concerning connectivity, which involves establishing connectivity links and leads to uplink activity by donor modems. In some system configurations, the network may advantageously take a greater role, for example by:

informing listeners of donor identity information or their uplink schedules;

triggering the sending of sounding signals by donor modems;

measuring the uplink signal time of arrival at the base station;

providing information on the Timing Advance instructions and measurements to the positioning engine; and/or providing information on base station location and timing, particularly if it is provided with GNSS.

In general, however, the participation of the network infrastructure in the positioning system is not essential, because the necessary sharing of measurements, interception-assistance information, and calculation-assistance information can be performed by the UEs themselves. Optional additional resources such as the server 180 and the supporting service 190 can also be provided independently of the network infrastructure. The wireless infrastructure network is still used for communication between the various devices, but since this communication can take place via the user plane, no modification of the infrastructure network is necessary.

Positioning Measurables and Equations

Figure 17:
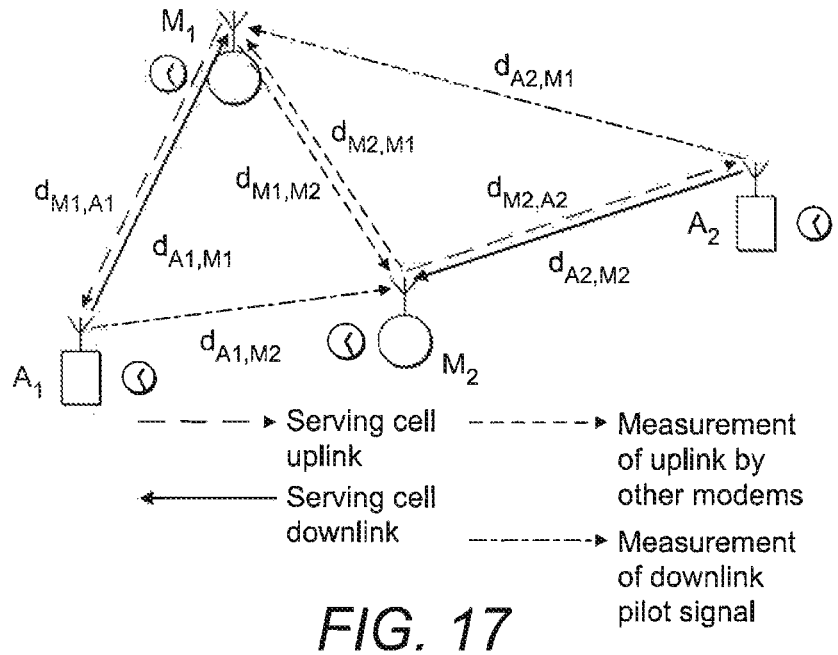
FIG. 17 shows a minimal case for generalised position measurement with two anchor base stations and two mobile modems.

If GNSS is not available and the location of all the mobiles is unknown, then in order to be able to solve for position we need to have at least as many measurables and knowns, as unknowns. Normally, to solve for the horizontal position and time of a mobile device we have three variables (latitude, longitude, and local time compared to transmitter reference time) and so need the signals from three synchronised base stations in order to be able to solve the set of equations and find the location of the mobile. Some useful special cases were considered earlier above; here, we consider the more general case. Let us take a minimal example for uplink as well as downlink measurements, as shown in FIG. 17.

We assume the base stations are in known locations and are synchronised, with known offsets (as a result of previous measurements). To summarise, we have 6 unknowns: namely, the latitude, longitude, and clock offset for each of the two mobiles. We therefore need six measurements, which can be the 4 downlink measurements, being the two by each mobile of each base station, and the 2 measurements by each mobile modem of the uplink signal of the other modem. So, if all the measurements are gathered and brought together then a position can be calculated. This is possible even though in this case we only have two base stations, whereas normally, for downlink-only systems, we would require three base stations. This assumes that the times of signal transmission are known, and the geometry is favourable for a geometric solution.

In more detail, we can fully set out all the equations, unknowns and measureables, as follows. There are 6 measurement equations for the times of arrival measured by the modems, for signals sent out at a time relative to the base station clock and the other modem clock respectively and received and measured with respect to the modem clock. These consist of three measurements for each modem:

$$T_{A1,M1} = d_{A1,M1} + c\tau_{A1} - c\tau_{M1}$$

$$T_{A2,M1} = d_{A2,M1} + c\tau_{A2} - c\tau_{M1}$$

$$T_{M2,M1} = d_{M2,M1} + c\tau_{M2} - c\tau_{M1}$$

$$T_{A1,M2} = d_{A1,M2} + c\tau_{A1} - c\tau_{M2}$$

$$T_{A2,M2} = d_{A2,M2} + c\tau_{A2} - c\tau_{M2}$$

$$T_{M1,M2} = d_{M1,M2} + c\tau_{M1} - c\tau_{M2}$$

In general, with NA base stations and NM modems there are $N_M \times [N_A + (N_M - 1)]$ such measurement equations.

Then there are 5 equations for the geometry between modems and base stations, and between the modems, and considering for simplicity the 2D case, with the latitude and longitude coordinates of each device being (x, y):

$$d_{A1,M1}^2 = (x_{A1} - x_{M1})^2 + (y_{A1} - y_{M1})^2$$

$$d_{A1,M2}^2 = (x_{A1} - x_{M2})^2 + (y_{A1} - y_{M2})^2$$

$$d_{A2,M1}^2 = (x_{A2} - x_{M1})^2 + (y_{A2} - y_{M1})^2$$

$$d_{A2,M2}^2 = (x_{A2} - x_{M2})^2 + (y_{A2} - y_{M2})^2$$

$$d_{M1,M2}^2 = (x_{M1} - x_{M2})^2 + (y_{M1} - y_{M2})^2$$

In general, there are $$N_M \times \left[ M_A + \frac{(N_M - 1)}{2} \right]$$

such geometry equations. The full set of variables comprises: the coordinates and time offset for each of the four devices (12 variables); and the distances between the devices (5 variables). Therefore, there are a total of 17 variables. In general, the number of variables is:

$$3(N_A + N_M) + N_M \times \left[ N_A + \frac{(N_M - 1)}{2} \right]$$

The 4 base station location parameters $(x_{A1}, y_{A1})$ and $(x_{A2}, y_{A2})$ are known, as are the base station time offsets, $\tau_{A1}$ and $\tau_{A2}$. In general, there are $3N_A$ such knowns. This is summarised in the table below.

TABLE 1

Illustrative knowns and variables for position estimation with uplink and downlink measurements, for a 2D solution, with known base station location and timing

| | Example, $N_A = 2, N_M = 2$ | In general |
|---|---|---|
| Time of arrival measurements | 6 | $N_M \times [N_A + (N_M - 1)]$ |
| Geometry equations | 5 | $N_M \times \left[N_A + \frac{(N_M - 1)}{2}\right]$ |
| Known in advance | 6 | $3N_A$ |
| Total knowns | 17 | $3N_A + N_M \times \left[2N_A + \frac{3(N_M - 1)}{2}\right]$ |
| Total variables | 17 | $3(N_A + N_M) + N_M \times \left[N_A + \frac{(N_M - 1)}{2}\right]$ |

The positions of the modems can be estimated if the total number of knowns is at least as great as the total number of variables, giving the condition for solvability as:

$$3N_A + N_M \times [N_A(N_M - 1)] \geq 3(N_A + N_M)$$

$$N_M \times [N_A + (N_M - 1)] \geq 3N_M$$

$$N_A + N_M \geq 4$$

As in this example, with $N_A=2$, $N_M=2$.

This means that the number of measurements and equations grows rapidly as the number of modems involved increases, giving the ability to robustly estimate the position. If there are more measurements than unknowns, then this improves the accuracy of the position estimation. However, it is noted that, even though the equations can be solved, there may still be ambiguities in the position estimation.

Geometrical Constraints

Figure 18:
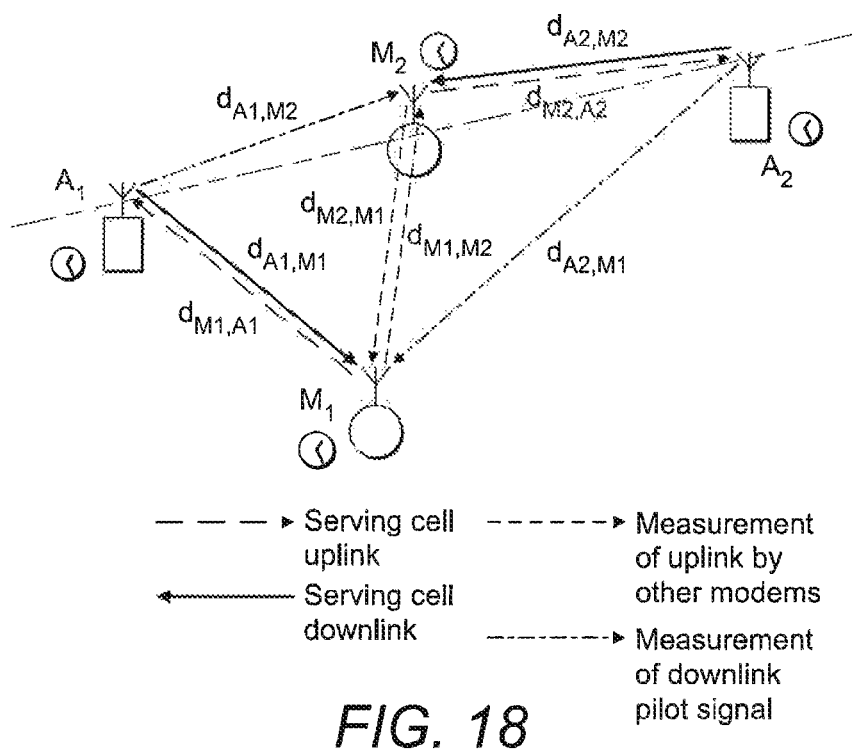
FIG. 18 shows the mirror image ambiguous solution for the case of FIG. 17.

In order to be able to solve the absolute position and orientation of the set of unknown modem locations, there must be at least two base stations observed, in known locations, and there must in addition be some other location information to resolve ambiguity. This is illustrated, for the minimal case analysed in FIG. 17, by way of contrast in FIG. 18.

The solution in this case has the modem locations reflected in the line of symmetry of the two base stations. If there is no additional information about the locations of the modems (for example based on other approximate knowledge or estimates, possibly from cell ID observations, or from past history), then signals from a third base station can be used to resolve which of the two possible solutions is the true one (the configuration in FIG. 17, or its reflection in FIG. 18).

The geometry of the arrangement of base stations and modems should preferably also be favourable, in order to avoid large uncertainties. For example, if the modems are close to each other, and are far from the base stations, then the separation between the modems will not be sufficient to provide clearly distinct measurements to the base stations from the two modem positions, and a large uncertainty in location will result. Again, in this case, a third base station can assist in the general location of the modems, with their fine separation measured by means of the measurements between them.

The description above has focused on time of arrival (ToA) as the measured characteristic of primary interest for an intercepted uplink signal. However, measurements of other characteristics may be made as well as, or instead of, ToA measurements. Some examples will be described below.

Phase Difference and Angle of Arrival Measurements

For UEs with multiple antennas, the measured carrier phase difference of signals arriving at two antennas can be used to estimate the angle of arrival of a signal. The phase difference between the measurements of the two signals corresponds to a path length difference, and so the locus of points with a constant phase difference corresponds to a hyperbola. For sources any significant distance from the antennas this closely approximates to the angle of arrival of the signal. This technique may be applied to modems listening to neighbours' signals.

Figure 19:
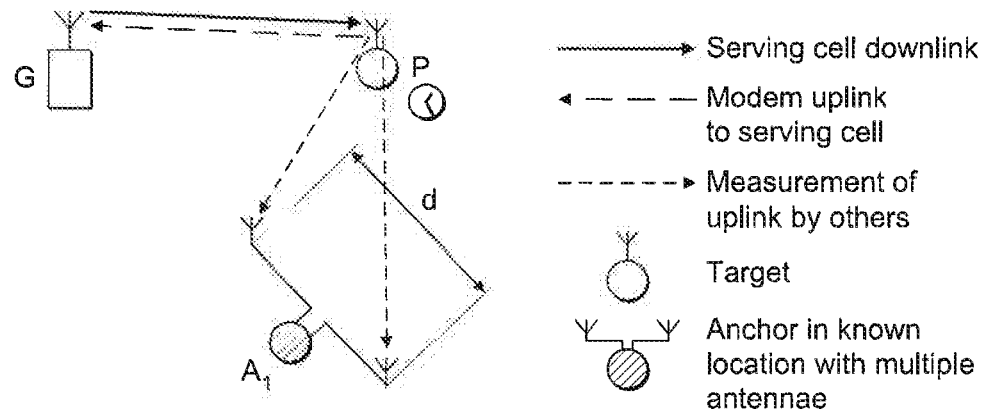
FIG. 19 illustrates measurement of an angle of arrival by phase-difference measurements among multiple antennas.

Modem receivers may support multiple antennas (for example for MIMO communication systems, or for diversity gains), and multiple antennas can also be used for positioning, as is known. FIG. 19 shows (not to scale) a system for positioning with an anchor modem with multiple antennas listening to the uplink, performing a carrier phase difference or angle of arrival measurement.

The effective phases and phase difference of the receiver local oscillator at the antennas may be known by design, and the receiver performs a phase difference measurement of the signals received at the two antennas, to estimate the angle of arrival. The separation between antennas d is typically $\lambda/2$.

Figure 20:
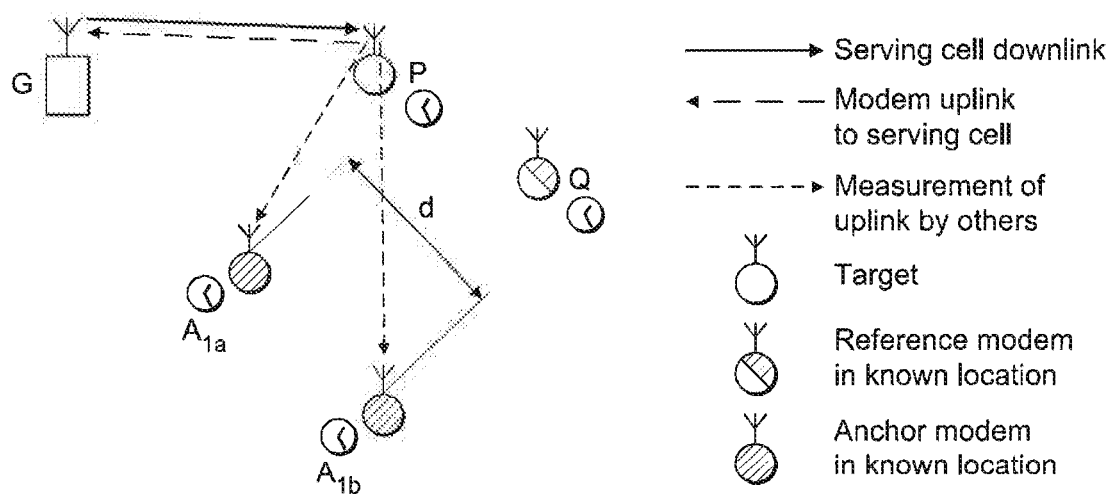
FIG. 20 illustrates a variant of FIG. 19 with the multiple antennas implemented in separate receivers.

Depending on the installation requirements it may be more convenient for the multiple antennas to be implemented by separate receivers, as illustrated (not to scale) in FIG. 20.

Similarly the signals arriving at the multiple antennas are measured, though in this case by separate receivers $A_{1a}$ and $A_{1b}$. Since the relative carrier phase of the two receivers is not known, measurements are also made of the signal from a reference device Q in a known location (signals not shown, for clarity). The phase-difference measurements are then combined to estimate the angle of arrival.

The carrier phase of different frames or bursts of signal from a donor is subject to variability—through error tolerances, uncertainty, frequency offsets. Indeed, in current systems, the carrier phase of a particular transmission is completely uncontrolled, and randomly distributed. The phase difference between reception of the signal on the two antennas can only then be measured if the measurement of the phase has to be performed on exactly the same signal transmitted by the donor.

Doppler

A receiver may also measure the rate of change of carrier phase, giving doppler information. Doppler estimation is an element of normal connectivity receivers, for tracking the signal. A doppler measurement by a modem of the signal from a neighbour transmitting an uplink signal to the base station can be used also to estimate the relative velocity of the listening and transmitting modems. This may be particularly useful in the following example scenarios
   a set of static beacons, with a moving target
   a cluster of moving vehicles Angle of Departure The explanation of the phase difference and angle above has been in terms of angle of arrival, but the phase difference from a transmitter (anchor) with multiple antennas can equally be measured, and gives rise to a measurement of the angle of departure of the signal in the direction of the (target) receiver.

In some embodiments, the first UE may be a MIMO device, and may transmit uplink signals from multiple antenna ports. To measure these different signals to give a measurement characteristic that can be used also for positioning, the receiver has to distinguish the signals from the two or more antenna ports being used by the first UE, which may be transmitted at different times, or with different spreading codes, and the receiver may then measure the phase difference between the two signals.

Signal Strength

Receivers may also usefully measure the signal strength of incident signals, to assist in the estimation of position. Signal strength may be used directly as an indicator of distance from the neighbour source (as signal strength decreases with distance), or it may be used as an indicator of the reliability of another measurement (as measurement quality degrades as the signal to noise ratio becomes smaller). The signal strength may be expressed in power, preferably in a logarithmic dB scale.

Signal strength differences between measurements of and by different devices may be formed, so that the actual transmitter power and/or the receiver sensitivity are cancelled, in a similar manner to the cancellation of transmitter and receiver clock and phase offsets.

Calibration

In some applications, the relative timing or phase (or signal strength) of two sources may be determined from the system design, and be known—for example as a result of some synchronisation (or calibration) means that is acting upon the transmitters. However, in other applications the phase offset between the transmitters may be determined by a calibration measurement performed by a convenient receiver listening at a known location. The location and the hyperbolic phase difference relationship are then used in reverse to calibrate the phase difference between the transmitters. The calibration may equally be done using a transmitter at a known location, with measurements used to calibrate the phase difference between receivers.

When multiple devices are participating as neighbour anchors, then they may measure or cancel the phase offset between them by means of measuring the signals each receives from the other, as discussed elsewhere in this document.

Calibration may be particularly advantageous if the two sources are only nominally at the same frequency, and that there is some small offset between them, so that the relative carrier phase of the sources drifts slowly with time. Such small offsets may well occur in situations where the oscillators are on the same channel, but only loosely controlled, and this will often be the case with UEs transmitting on their uplink.

The reference device in a known location may conveniently itself be an anchor, and there may be multiple such devices.

Assistance with Making Multiple Measurements

Figure 21:
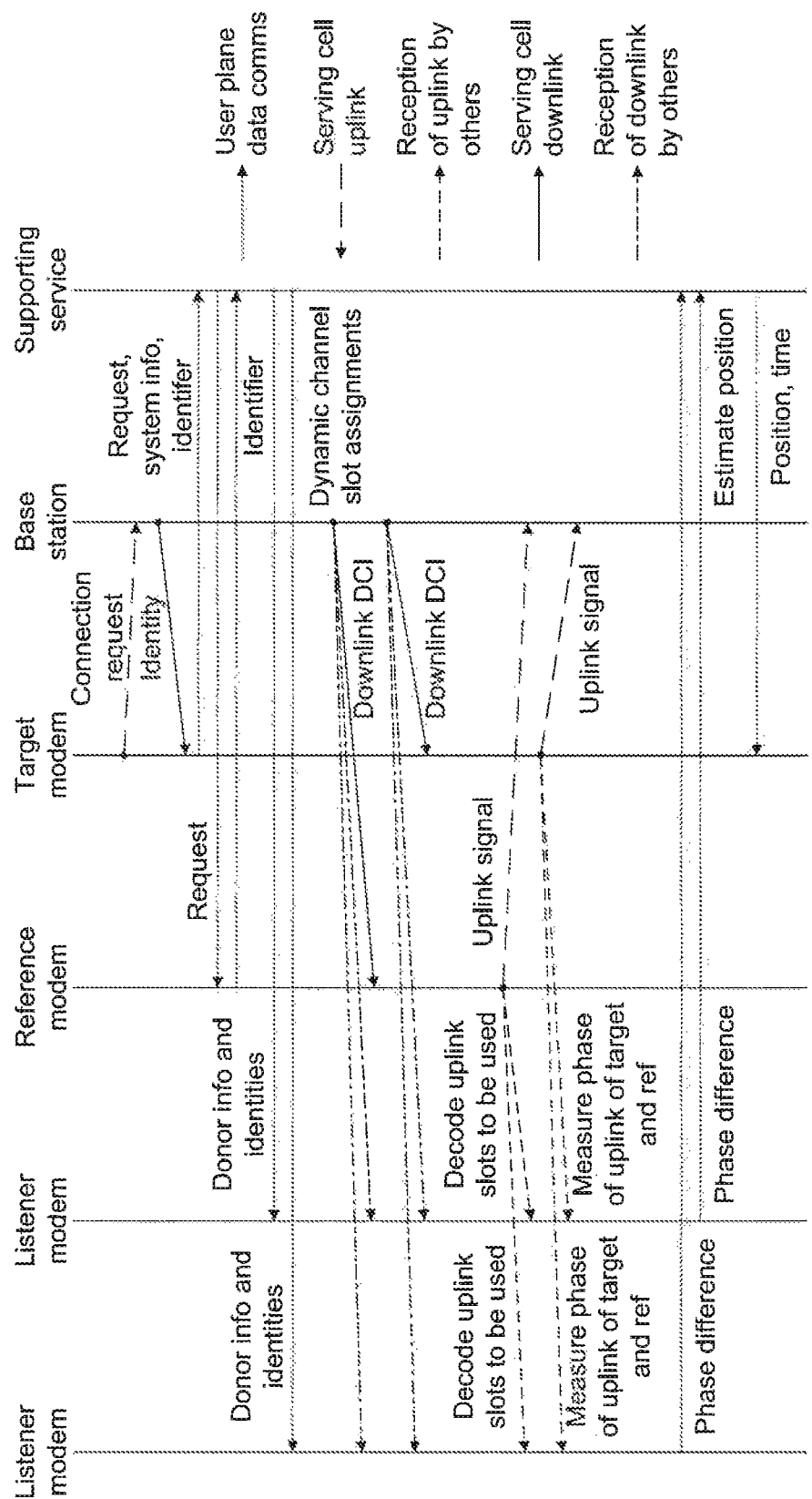
FIG. 21 is a further example of a sequence of operations, showing an assistance flow for phase-difference measurements.

FIG. 21 is an additional example illustrating the assistance flow for phase difference measurements by two listener modems of a target modem, and a reference modem.

Key elements in this assistance flow are:
1. the target UE informs the supporting service of its identity. The supporting service informs the listener UEs accordingly. This enables step 2.
2. decoding by the listeners of downlink messages from the base station to the target modem. This enables step 3.
3. the listeners intercept the uplink signal from the target at the frequency/time/code determined by the network,
4. multiple listeners intercepting the same transmitted uplink signal,
5. the measurements are compared with measurements also made of a signal from a reference modem The elements are described further in Table 2.

TABLE 2

| | Key uplink positioning system features | |
|---|---|---|
| | Feature | Implications |
| 1 | The target (first UE) informs the positioning system and from there the listener (second UE) of its identity | This might or might not be with the permission of the network operator, and so is an important step. The identity is temporary and allocated by the network, and used so that the network can communicate with the specific device (see ubx122). Disclosure of the identity is preferably managed, as will be discussed later |
| 2 | Decoding by the listener of downlink messages from the base station to the target modem | This is on a frame level, specifically when is the modem going to transmit, on which frequency, and with which coding scheme. That is, what are its Medium Access Control parameters going to be? This efficiently allows the interception of signals by many listening devices. Otherwise, each device has to be explicitly informed, for example by sending a message to it, about the future transmission by the donor modem - using capacity, taking time, and limiting the total number of devices which can be informed and which can listen to the donor modem. |
| 3 | The listener intercepts the uplink signal from the target at the frequency/time/code determined by the network, and measures it | The measurement may be time of arrival. In a receiver with multiple antennas we may also measure angle of arrival, or the carrier phase difference between the antennas of the single receiver. We may measure the phase, for example for comparison with a phase measurement of another signal - a signal from another donor modem (to be) transmitted at a different time. We may also measure other parameters, such as signal strength, doppler, and so on. |

TABLE 2-continued

Key uplink positioning system features

| | Feature | Implications |
|---|---|---|
| 4 | Multiple listeners intercept the same transmitted uplink signal | With multiple listeners intercepting precisely the same signal and signal frame, the variations in frame timing, and in the arbitrary carrier phase used, can be neglected/eliminated by forming difference measurements. This improves precision. This allows phase difference (which may be called angle of arrival) measurements to be made between antennas connected to different listening receivers, as each receiver may receive the assistance information and so is able to make a measurement of the signal. A difference is then formed of the measurements by different listening devices, for use for phase difference (angle of arrival) positioning. |
| 5 | Such measurement sets are made of multiple devices, and are compared | The receiver makes a difference measurement of the signal from the target, in comparison with the reference device. In this way, the local time and phase offsets of the receiver can be neglected/eliminated, by forming difference measurements. The reference can alternatively be thought of as enabling a calibration. |

Explicit Granting of Permission to Use Signals

The interception-assistance information will, in many cases, include the temporary identifier allocated to the neighbour, so that the listening modem can decode the radio spectrum allocation to be used by the neighbour, and so can use its signal for ranging.

The temporary identifier may be made available by the neighbour modem (or by the supporting service as intermediary).

In many circumstances, it is desirable that the availability and use of the network identity information can be limited by the neighbour device.

- control is then retained about which devices may use such a temporary identity—in particular, which modems may be allowed to listen to the identified neighbour signals. (So, for example, neighbours owned by one user may only be listened to by modems also owned by the user.)
- control may also be retained about the purpose of the usage by any other device—in particular that the temporary identifier is constrained by the software in the listening device only to be used for positioning purposes, but not to facilitate the decoding of any further data or user traffic.
- control may be varied according to the circumstances, for example to facilitate the location of a device in an emergency.

The availability and use of such identity information may be managed by the supporting service 190.

The actual identity of the neighbour device (its intrinsic identity or owner) may be protected. That is, the temporary identifier may made anonymous by the supporting service 190. The neighbour may thereby provide support for positioning by co-devices, without loss of privacy.

Although not so important when performing positioning using inter-device ranging with explicit (Device to Device) transmissions (as involvement of the listening device and donor device is explicit in the case of Device to Device transmission), it is important when identity information is made available to multiple other devices.

Selection of the Transmission Characteristics of the Neighbour

It is suggested that the performance of the positioning system can be improved if the signal transmitted by the neighbor (first UE) can be varied by the positioning system. Examples are:

- choice of a transmitter power sufficient for reception and measurement by the second UE
- choice of particular frequency or antenna, which is favourable to reception by the second UE
- transmission of multiple signals, over a set of frequencies covering a wide bandwidth (for diversity and/or greater resolution)
- transmission of signals from more than one antenna, for diversity and/or direction of departure measurement It is desirable that the transmission chosen is compatible with the normal operation of the wireless infrastructure network. However, where there is flexibility, this can be exploited by a positioning system and the neighbour device to transmit signals that improve the ability of the second UE (listener) to make measurements and perform positioning.

The second UE (listener) may influence the choice of the transmission characteristics, directly by requesting certain features, or indirectly by reporting its approximate location, allowing optimisation of the neighbour transmission requested by the supporting service 190.

Combinations

The various different measurements may be combined together in the electronic device 180 providing the positioning engine—for example, combining time of arrival, angle of arrival, and signal strength measurements.

Known and Unknown Device Locations

For ease of explanation, the above description has been for the example of a target "donor" modem, the transmissions of which are intercepted and listened to by anchor receivers in known locations.

Figure 22:
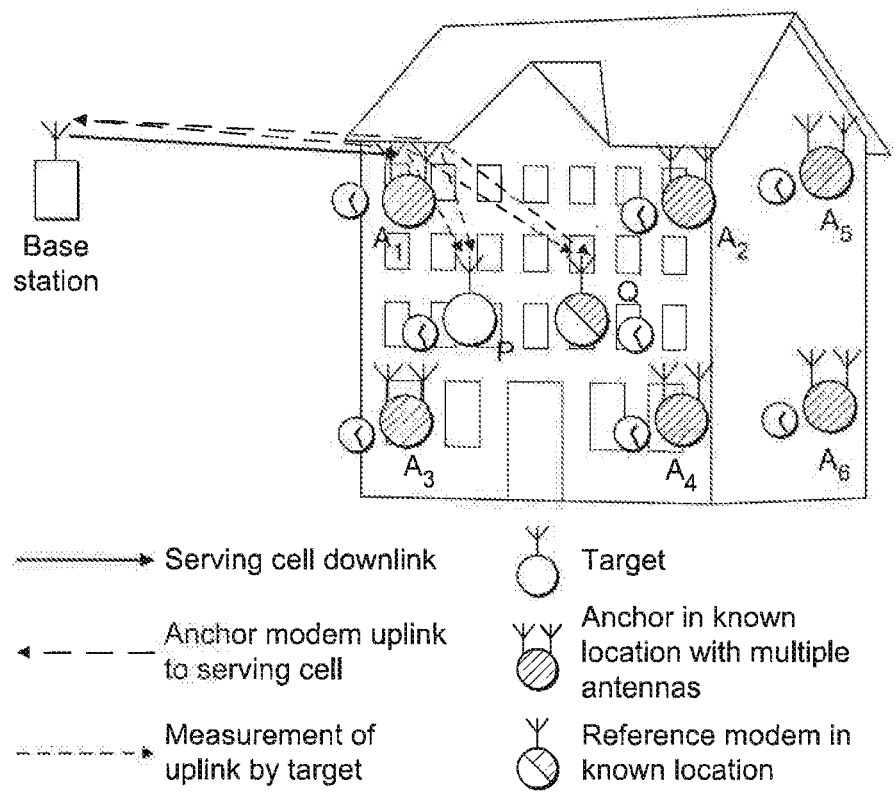
FIG. 22 illustrates measurement of anchor uplink transmissions by a mobile target modem.

Depending on the system requirements, the same approach can equally be applied in a reverse configuration, in which the anchor devices are beacons and transmit, their signals being intercepted and measured by the target modem, and used for positioning. Such a configuration is illustrated in FIG. 22.

This example illustrates the case when the uplink signal from an anchor is intercepted and measured by a target modem P. The same signal is also intercepted and measured by the reference device Q—shown here as a separate device for clarity, although it may functionally be combined into an anchor.

One anchor transmission is shown illustrated for simplicity—measurements may be made, in turn or concurrently, of the signals transmitted by each of the anchors. The method is the same as that already described for the case of the signal transmitted by a target modem.

Devices Acting as Donors and Listeners

As described elsewhere in this document, UEs may act as both donors and as listeners according to the method, leading to additional and alternative measurements. A simple example is illustrated in FIG. 23, in which two target UEs listen to each others' transmissions to the base station, and measure the timing relative to their own transmissions, in order to estimate the distance between them.

Figure 23:
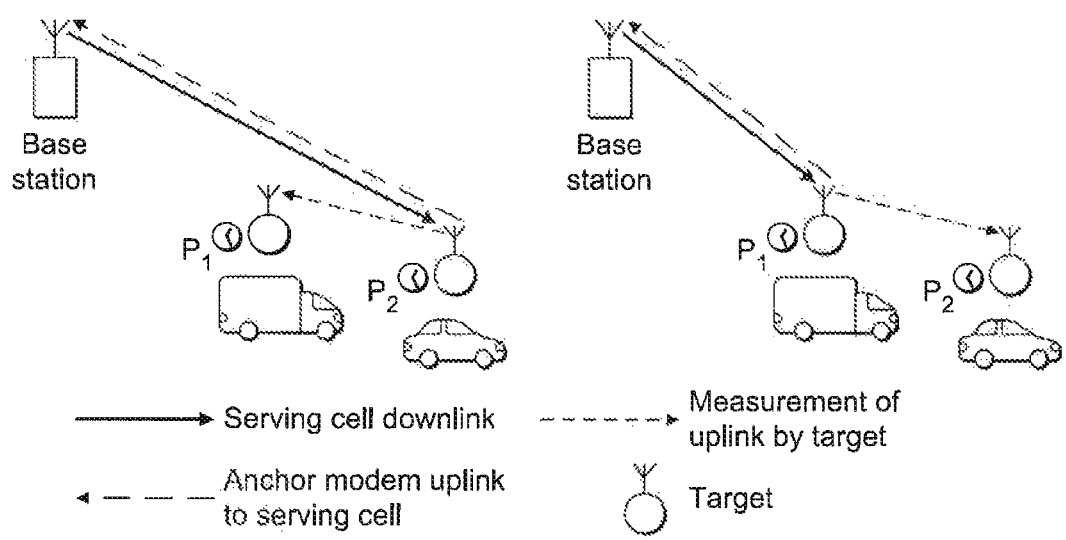
FIG. 23 illustrates measurement of device separation by devices acting as donor and as listener.

For clarity and ease of illustration, the drawing in FIG. 23 is duplicated. As shown on the left-hand side, UE $P_1$ intercepts and measures the uplink signal to the base station transmitted by its neighbour $P_2$, with any timing or phase information recorded relative to the local clock of $P_1$. In the right-hand drawing, similarly, UE $P_2$ intercepts and measures the uplink signal to the base station of its neighbour $P_1$. The measurement results are shared by $P_1$ and $P_2$ with each other, together with calculation-assistance information about the uplink signal transmissions by each UE.

$P_1$ and $P_2$ know the signal strength, antennas used, accurate time, phase and other useful characteristics of their own uplink signal transmissions, and share this calculation-assistance information with one another, allowing them to calculate the separation distance, using the "round trip" delay method, as presented elsewhere in this document.

Note that the two modems $P_1$ and $P_2$ do not form a so-called "Device to Device" link in this process, but that all wireless communication by each device is purely with the base station. This avoids any need to set up direct communication between devices. (There is high level communication of information, but this is flowing via the upper protocol layers, and does not involve forming a physical layer wireless link.)

Targets may of course also have multiple antennas and make phase difference and angle measurements. The importance of being able to make such measurements without having to directly and specifically send a wireless signal from one device to another for it to be measured, can be illustrated in a practical example, sketched in FIG. 24. This figure illustrates a further example, in which sets of measurements are made involving multiple devices. For simplicity, FIG. 24 only illustrates one set of measurements, as the uplink signal of $P_1$ is intercepted and measured by the other UEs. This set of measurements is repeated for the uplink signal transmitted by each respective UE. In this way:
  the targets take on the role of donor and then of listener
  multiple measurements are made of the same signals
  difference measurements are made of signals from multiple devices
  angle of arrival and angle of departure is measured
  transmission information is known and shared
  measurements are made and shared
  and are used to assist relative and absolute positioning by targets and the infrastructure This is all done using the normal communications channels and transmissions between the devices and the base station, with the method of interception of these signals by neighbouring devices.

Figure 24:
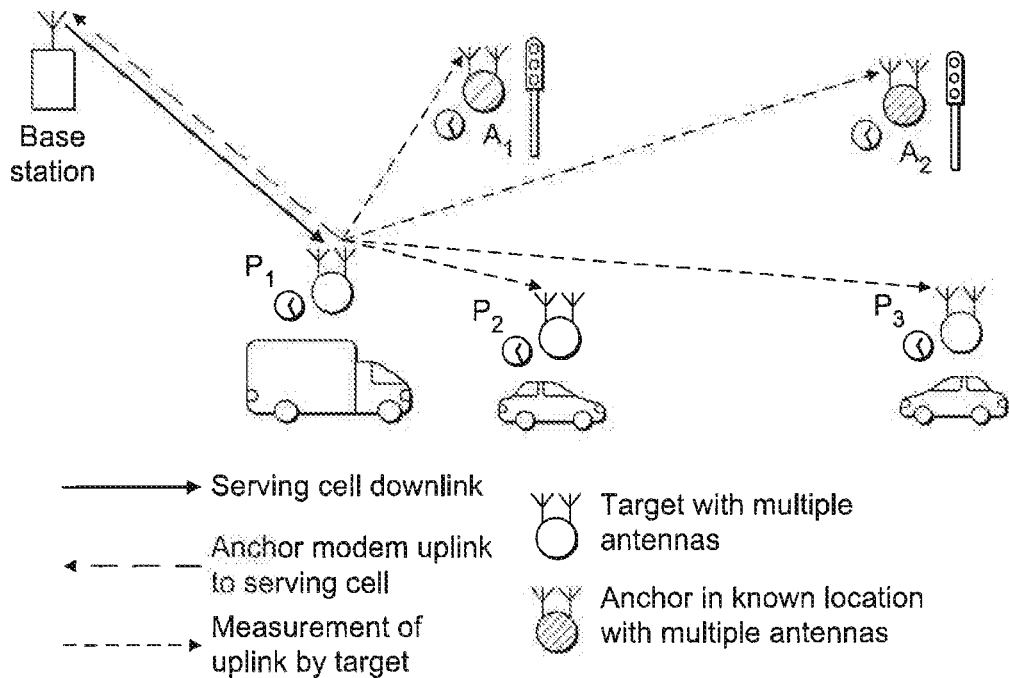
FIG. 24 illustrates multiple measurements.

Note that FIG. 24 shows just the modem $P_1$ acting as donor, for clarity, but it will be understood that all of the UEs (including target modems $P_2$ and $P_3$, and anchor modems $A_1$ and $A_2$) can also act as donors of uplink signals for interception by the other neighbouring UEs.

Combining Measurements by and of Multiple Devices

Measurements of intercepted uplink signals may be used for assisting in the estimation of position or time. The use of the carrier phase of the uplink signals is particularly useful for signals on the same frequency for:
  a set of modems using their uplink signals so that they together act as beacons; and/or
  a time-division duplex communication system in which the downlink and uplink are on the same frequency, so that a receiver can compare and combine base station and neighbour modem signals and measurements.

Phase measurements from uplink signals can further be used, in pairs for angle of arrival estimation, and from phase doppler for determining velocity.

Using Phase Measurements on Multiple Received Frequencies

The phase measurements made on a single frequency may be advantageously combined in a receiver and in a positioning system with measurements made on multiple frequencies. As an example in a frequency division duplex cellular system, a first set of phase measurements from a set of multiple modems acting as beacons, all using the same uplink channel frequency (and using TDMA on that uplink channel) may be combined together to give a first set of phase difference measurement characteristics. This may be repeated for a second set of signals from first UEs on a second uplink channel frequency, these first UEs perhaps being on a different network, which second set of phase measurements may be then combined together to give a second set of phase difference measurement characteristics.

As is well known, phase difference measurements can also be made by a receiver between the phase measurements of downlink signals of base stations in the same network, all using the same downlink frequency.

Further, if additional timing information is taken into account, the phase difference between different uplink signals on different frequencies, can be measured and used for positioning. These may be different uplink signals on different frequencies—that is, between signals respectively from the first and second sets of uplink signals in the above example, or between uplink and downlink signals when these are on different frequencies This specific case of measurement characteristics relating to the phase difference between different carrier frequencies can be addressed using techniques such as those disclosed in WO2017/178041 and WO2017/178573.

Figure 25:
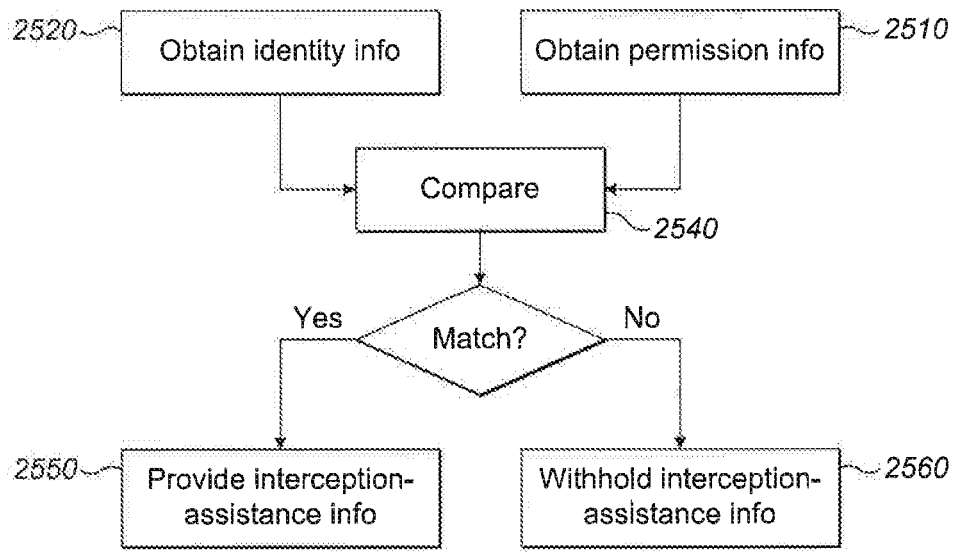
FIG. 25 is a flowchart of a method of controlling access to interception-assistance information, according to an embodiment.

As mentioned previously above, it is desirable to control access to the interception-assistance information, by the donor UE granting permission to certain devices to use it. FIG. 25 is a flowchart of a method of controlling access to interception-assistance information, according to an embodiment. This method is preferably performed in conjunction with one of the methods described previously above, such as the method of FIG. 3. In the present example, the method of FIG. 25 is performed by the supporting service 190, but this is not essential.

In step 2510, the supporting service 190 obtains permission information from the first UE 112. The permission information defines a group of UEs that is authorised by the first UE 112 to obtain the interception-assistance information. That is, the permission information defines a group of UEs that are permitted to intercept the first UE's uplink signal. The group of UEs may be defined by their individual identities or by a group identity.

In step 2520, the supporting service 190 obtains, from the second UE 110 identity information of the second UE.

In step 2540, the supporting service 190 compares the obtained identity information of the second UE with the obtained permission information. If they match, then the second UE is determined to be authorised to receive the interception-assistance information, and the supporting service 190 provides the interception-assistance information to the second UE (step 2550). If they do not match, then the supporting service 190 withholds the interception-assistance information from the second UE. That is, the second UE is denied access to the interception-assistance information, because it is not one of the permitted UEs defined in the permission information. The identity information can be determined to match the permission information if an individual identity or group identity in the identity information is also present in the permission information.

As mentioned previously above, it has been found that the differences in characteristics between received uplink signals can provide a rich source of information for positioning and timing calculations. An example of this will now be described.

Figure 26:
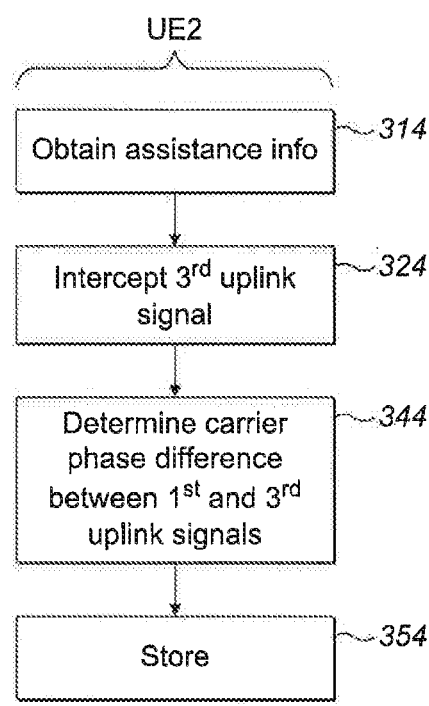
FIG. 26 is a flowchart illustrating further steps that may be performed in conjunction with the method of FIG. 3.

FIG. 26 is a flowchart illustrating further steps that may be performed in conjunction with the method of FIG. 3. The steps illustrated are performed by the second UE 110, in addition to the steps 310, 320, 330, 340, and 350 illustrated in FIG. 3.

In step 314, the second UE 110 obtains interception-assistance information relating to a third uplink signal to be transmitted by the fifth UE to a third BS serving the fifth UE. The interception-assistance information may be obtained from the fifth UE without intermediary, or may be provided via the supporting service 190 as an intermediary.

In step 324, the second UE 110 intercepts the third uplink signal. The second UE uses the interception-assistance information to help it intercept the third uplink signal. As will be recalled from FIG. 3, the second UE 110 also intercepts (in step 320) the first uplink signal, using respective interception-assistance information.

In step 344, a difference is determined between at least one characteristic of the intercepted first uplink signal and at least one corresponding characteristic of the intercepted third uplink signal at the second UE. In the present embodiment, the difference is a difference between a carrier phase of the first uplink signal and a carrier phase of the third uplink signal. This can be conveniently determined at the second UE 110. However, in other embodiments, a phase difference (or other difference) may instead be determined remotely from the second UE—for example, at the remote server 180 in the course of a positioning or timing calculation.

In step 354, the second UE 110 stores the determined difference in the memory 160, for subsequent use in assisting the calculation of a position and/or time. It will be understood, of course, that the position and/or time to be calculated may be those at the first, second, or fifth UE.

In the embodiment of FIG. 26, the characteristics at the second UE 110 of two intercepted uplink signals are compared with one another to produce a difference that can be used in positioning and/or timing calculations. Alternatively or in addition, a characteristic of the intercepted first uplink signal could be compared with a corresponding characteristic of another signal received by the second UE 110 (such as a downlink signal). As a further alternative or addition, a characteristic of the intercepted first uplink signal could be compared with a corresponding characteristic of a signal transmitted by the second UE 110. In particular, one or more characteristics of the intercepted first uplink signal could be compared with one or more corresponding transmission characteristics (at the second UE) of the second uplink signal transmitted by the second UE. For example, a carrier phase of the intercepted first uplink signal, as received by the second UE, could be compared with a carrier phase of the second uplink signal, as transmitted by the second UE.

As explained already above, some coordination between the various UEs is desirable. In some cases, UEs may be instructed or requested to transmit uplink signals (that is, to be donors), while in some cases, UEs may be instructed or requested to intercept uplink signals (that is, to be listeners). And in some cases UEs may be instructed to act as both donors and listeners. Any given UE will typically have specific capabilities in respect of transmitting and intercepting signals, as determined by factors such as the frequency, bandwidth, modulation scheme, and communications protocols that the UE is designed to implement.

It is therefore useful for UEs to be able to describe their capabilities in respect of intercepting and transmitting uplink signals, and to be able to share those descriptions between UEs and/or with the supporting service 190. The UEs and/or the supporting service can then establish which of the UEs can intercept the uplink signals of which other UEs. They can also optimise the transmission and interception of uplink signals according to the capabilities of the UEs. For example, the supporting service 190 may instruct the first UE 112 to transmit an uplink signal with the maximum bandwidth that can be received by the second UE 110, in order to improve the precision of the subsequent positioning and/or timing calculation.

Figure 14:
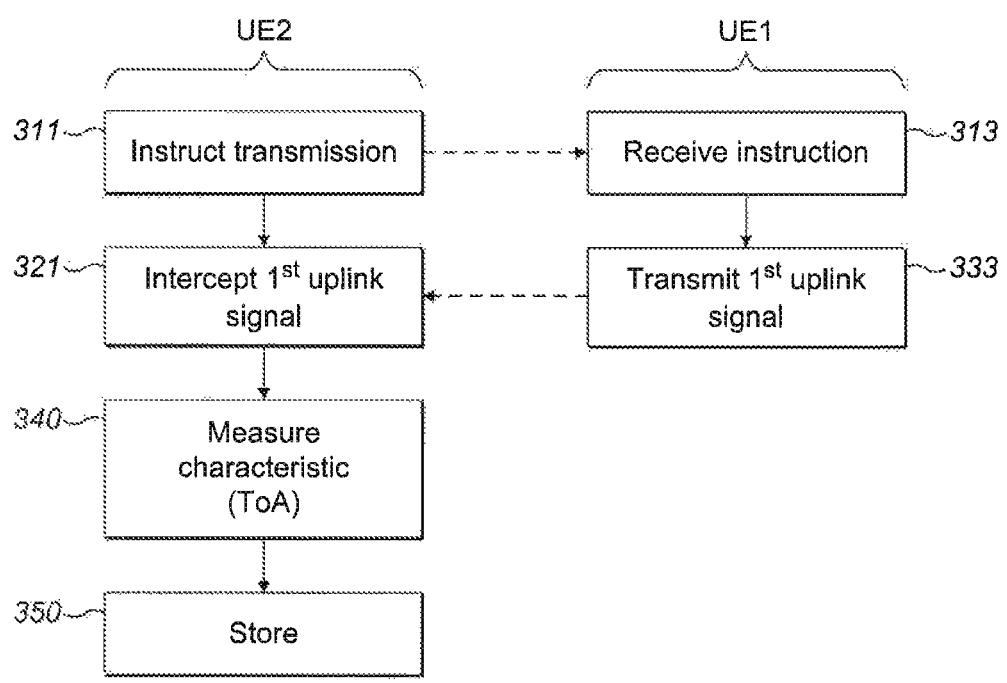
FIG. 14 is a flowchart illustrating a method according to an embodiment of a further aspect.

FIG. 14 is a flowchart illustrating a method according to an embodiment of a further aspect. In this method, instead of the listener (second UE 110) receiving interception-assistance information, the listener instructs the donor (first UE 112) how to transmit the first uplink signal. The instruction includes parameters for the first uplink signal—in other words, one or more characteristics that the first uplink signal should have upon transmission by the first UE. These characteristics may comprise, for example, the time, phase, strength, bandwidth, angle, and/or antenna configuration for the transmission. Accordingly, the second UE 110 is able to intercept the first uplink signal without the first UE 112 sharing any additional interception-assistance information.

In greater detail: in step 311, the second UE 110 instructs the first UE 112 to transmit the first uplink signal with defined characteristics. The instruction is sent by user plane data communication across the network 100. In step 313, the first UE 112 receives the instruction from the second UE.

In step 333, the first UE 112 transmits the first uplink signal with the defined characteristics as instructed. Because the second UE chose the characteristics, it knows them in advance, and can intercept the first uplink signal without the need for any further interception-assistance information. This is done in step 321.

The remaining steps of the method are the same as those described above with reference to FIG. 3. In step 340, the second UE 110 measures at least one characteristic of the intercepted first uplink signal. In this example, the measured characteristic is a time of arrival. This is stored, in step 350, for use subsequently in calculating a position or time.

Note that, in common with the method illustrated in FIG. 3, the method of FIG. 14 can be implemented by interactions between the UEs, using user plane data communication, optionally relying on a supporting service 190, but without needing specific intervention by the infrastructure of the wireless infrastructure network. This means that both methods can be implemented in conjunction with an existing wireless infrastructure network (or more than one wireless infrastructure network) without requiring modification of the protocol standards of the infrastructure network.

Although the description above has focused primarily on calculations of position, those skilled in the art will understand that the same equations can also be solved for time, or position and time, according to the needs of a given application, dependent on the availability of a sufficient number of measurements to solve the equations.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

Furthermore, in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The invention claimed is:

1. A second User Equipment (UE) in a wireless infrastructure network, the second UE comprising:
a first receiver configured to intercept a first uplink signal transmitted from a first UE to a first base station serving the first UE;
a transmitter configured to transmit a second uplink signal to a second base station serving the second UE;
a second receiver configured to receive a downlink signal transmitted from the second base station; and
a processor configured to:
obtain interception-assistance information related to the first uplink signal, wherein at least a portion of the interception-assistance information is originated from the first UE;
control the first receiver to intercept the first uplink signal based on the interception-assistance information;
measure at least one characteristic of the first uplink signal; and
perform an operation of:
using the measured characteristic to determine positions of one or more devices or local times of the one or more devices; or
sending the measured characteristic to a remote electronic device for the remote electronic device to determine the positions of the one or more devices or the local times of the one or more devices,
wherein the processor is configured to share the interception-assistance information with a third UE before the second uplink signal is transmitted, to assist the third UE to intercept the second uplink signal, wherein the interception-assistance information is related to at least one of the second UE or the second uplink signal.

2. The second UE of claim 1, wherein the downlink signal is a first downlink signal, the interception-assistance information comprising at least one of:
identity information of the first UE;
at least one of position information or velocity information of the first UE;
information about one or more antennas used by the first UE to transmit the first uplink signal;
first parameters of the first uplink signal;
second parameters of the first uplink signal that are specific to the first UE;
third parameters of a second downlink signal transmitted from the first base station; or
information relevant to configuration of the first UE, wherein the information is sent from the first base station in the second downlink signal.

3. The second UE of claim 1, wherein the measured at least one characteristic comprises at least one of:
a time of arrival of the first uplink signal at the first receiver;

a received signal strength of the first uplink signal;
an angle of arrival of the first uplink signal; or
a carrier phase of the first uplink signal.

4. The second UE of claim 1, wherein the measured at least one characteristic comprises a difference between a characteristic of the first uplink signal and a corresponding characteristic of another signal.

5. The second UE of claim 1, wherein the measured at least one characteristic comprises at least one of:
a time difference between another signal and the arrival of the first uplink signal;
a signal strength difference between another signal and the first uplink signal;
an angular difference between a direction of another signal and a direction of the first uplink signal; or
a phase difference between a carrier phase of the first uplink signal and a carrier phase of another signal.

6. The second UE of claim 1, wherein:
the first receiver and the second receiver are provided by a common receiver, and
the processor is configured to control the common receiver to switch between receiving the downlink signal and intercepting the first uplink signal.

7. The second UE of claim 1, further comprising:
a Global Navigation Satellite System (GNSS) receiver;
wherein the processor is further configured to control the GNSS receiver to send GNSS positioning data to an electronic device.

8. The second UE of claim 1, wherein the processor is configured to obtain the interception-assistance information via user plane data communication.

9. The second UE of claim 1, wherein the processor is further configured to:
report a device description to a computer providing a supporting service,
wherein the device description includes an uplink-interception capability of the first receiver.

10. A second User Equipment (UE) in a wireless infrastructure network, the second UE comprising:
a first receiver configured to intercept a first uplink signal transmitted from a first UE to a first base station serving the first UE;
a transmitter configured to transmit a second uplink signal to a second base station serving the second UE;
a second receiver configured to receive a downlink signal transmitted from the second base station;
and
a processor configured to:
obtain interception-assistance information related to the first uplink signal, wherein at least a portion of the interception-assistance information is originated from the first UE;
control the first receiver to intercept the first uplink signal based on the interception-assistance information;
measure at least one characteristic of the first uplink signal; and
perform an operation of:
using the measured characteristic to determine positions of one or more devices or local times of the one or more devices; or
sending the measured characteristic to a remote electronic device for the remote electronic device to determine the positions of the one or more devices or the local times of the one or more devices,
wherein the processor is configured to control the transmitter to transmit the second uplink signal in response to the first receiver intercepting the first uplink signal.

11. The second UE of claim 10, wherein the downlink signal is a first downlink signal, the interception-assistance information comprising at least one of:
identity information of the first UE;
at least one of position information or velocity information of the first UE;
information about one or more antennas used by the first UE to transmit the first uplink signal;
first parameters of the first uplink signal;
second parameters of the first uplink signal that are specific to the first UE;
third parameters of a second downlink signal transmitted from the first base station; or
information relevant to configuration of the first UE, wherein the information is sent from the first base station in the second downlink signal.

12. The second UE of claim 10, wherein the measured at least one characteristic comprises at least one of:
a time of arrival of the first uplink signal at the first receiver;
a received signal strength of the first uplink signal;
an angle of arrival of the first uplink signal; or
a carrier phase of the first uplink signal.

13. The second UE of claim 10, wherein the first receiver and the second receiver are provided by a common receiver, and
the processor is configured to control the common receiver to switch between receiving the downlink signal and intercepting the first uplink signal.

14. A second User Equipment (UE) in a wireless infrastructure network, the second UE comprising:
a first receiver configured to intercept a first uplink signal transmitted from a first UE to a first base station serving the first UE;
a transmitter configured to transmit a second uplink signal to a second base station serving the second UE;
a second receiver configured to receive a downlink signal transmitted from the second base station;
and
a processor configured to:
obtain interception-assistance information related to the first uplink signal, wherein at least a portion of the interception-assistance information is originated from the first UE;
control the first receiver to intercept the first uplink signal based on the interception-assistance information;
measure at least one characteristic of the first uplink signal; and
perform an operation of:
using the measured characteristic to determine positions of one or more devices or local times of the one or more devices; or
sending the measured characteristic to a remote electronic device for the remote electronic device to determine the positions of the one or more devices or the local times of the one or more devices,
wherein the downlink signal is a first downlink signal, the second UE further comprising:
a third receiver configured to receive a second downlink signal transmitted from the first base station, wherein the processor is configured to obtain at least a portion of the interception-assistance information by decoding the second downlink signal received from the first base station.

15. The second UE of claim 14, wherein the processor is configured to:
   obtain a first portion of the interception-assistance information from a supporting service or from the first UE; and
   use the first portion of the interception-assistance information to obtain a second portion of the interception-assistance information from the second downlink signal.

16. The second UE of claim 14, wherein the downlink signal is a first downlink signal, the interception-assistance information comprising at least one of:
   identity information of the first UE;
   at least one of position information or velocity information of the first UE;
   information about one or more antennas used by the first UE to transmit the first uplink signal;
   first parameters of the first uplink signal;
   second parameters of the first uplink signal that are specific to the first UE;
   third parameters of a second downlink signal transmitted from the first base station; or
   information relevant to configuration of the first UE, wherein the information is sent from the first base station in the second downlink signal.

17. The second UE of claim 14, wherein the measured at least one characteristic comprises at least one of:
   a time of arrival of the first uplink signal at the first receiver;
   a received signal strength of the first uplink signal;
   an angle of arrival of the first uplink signal; or
   a carrier phase of the first uplink signal.

18. The second UE of claim 14, wherein the first receiver and the second receiver are provided by a common receiver, and
   the processor is configured to control the common receiver to switch between receiving the downlink signal and intercepting the first uplink signal.

19. A method for gathering a measurement, the method comprising:
   obtaining, from a first UE in a wireless infrastructure network, interception-assistance information relating to a first uplink signal to be transmitted by the first UE to a base station serving the first UE;
   intercepting the first uplink signal at one or more second UEs based on the interception-assistance information;
   measuring at least one characteristic of the intercepted uplink signal at the one or more second UEs;
   storing the measured at least one characteristic for computing at least one of: a position of the first UE, positions of the one or more second UEs, a local time at the first UE, or local times at the one or more second UEs; and
   sharing the interception-assistance information with a third UE before a second uplink signal is transmitted, to assist the third UE to intercept the second uplink signal, wherein the interception-assistance information is related to at least one of the second UE or the second uplink signal.

20. A non-transitory computer-readable medium storing instructions that are executable by one more processors of an apparatus to perform a method, the method comprising:
   obtaining, from a first UE in a wireless infrastructure network, interception-assistance information relating to an uplink signal to be transmitted by the first UE to a base station serving the first UE;
   intercepting the uplink signal at one or more second UEs based on the interception-assistance information;
   measuring at least one characteristic of the intercepted uplink signal at the one or more second UEs;
   storing the measured at least one characteristic for computing at least one of: a position of the first UE, positions of the one or more second UEs, a time at the first UE, or times at the one or more second UEs; and
   sharing the interception-assistance information with a third UE before a second uplink signal is transmitted, to assist the third UE to intercept the second uplink signal, wherein the interception-assistance information is related to at least one of the second UE or the second uplink signal.

* * * * *